United States Patent
Lotya et al.

(10) Patent No.: US 11,341,389 B2
(45) Date of Patent: *May 24, 2022

(54) MANUFACTURING METAL INLAYS FOR DUAL INTERFACE METAL CARDS

(71) Applicant: AmaTech Group Limited, Spiddal (IE)

(72) Inventors: Mustafa Lotya, Celbridge (IE); David Finn, Tourmakeady (IE); Darren Molloy, Galway (IE)

(73) Assignee: AmaTech Group Limited, County Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,176

(22) Filed: Mar. 3, 2020

(65) Prior Publication Data

US 2020/0250504 A1    Aug. 6, 2020

Related U.S. Application Data

(63) Continuation-in-part of application No. 16/729,530, filed on Dec. 30, 2019, now Pat. No. 10,977,542, and
(Continued)

(51) Int. Cl.
  *G06K 19/02* (2006.01)
  *G06K 19/077* (2006.01)
  *H01Q 1/22* (2006.01)

(52) U.S. Cl.
  CPC . *G06K 19/07722* (2013.01); *G06K 19/07745* (2013.01); *H01Q 1/2225* (2013.01)

(58) Field of Classification Search
  CPC ....... G06K 19/07722; G06K 19/07745; G06K 1/2225
  (Continued)

(56) References Cited

U.S. PATENT DOCUMENTS 2,747,257 A * 5/1956 Ashcroft ................ H01H 69/02
                                                    29/623
3,896,726 A * 7/1975 Staats .................. B42D 25/318
                                                    283/77
(Continued)

FOREIGN PATENT DOCUMENTS

EP   1158601   11/2001
EP   1031939   9/2009
(Continued)

*Primary Examiner* — Thien M Le
(74) *Attorney, Agent, or Firm* — McAndrews, Held & Malloy, Ltd.

(57) ABSTRACT

A "core" or "inlay" for a smartcard may comprise a first metal layer and a second metal layer, and may be formed by folding a single metal layer upon itself. A module cavity may be formed in the first metal layer by laser cutting, prior to laminating. An adhesive layer may be disposed between the two metal layers. A module opening may be formed in the second metal layer by milling, after laminating the first metal layer to the second metal layer. A slit in a metal layer may extend from an outer edge of the layer to the cavity or opening, thereby forming a coupling frame. The slit may have a termination hole at either end or at both ends of the slit. The slits of two metal layers may be positioned differently than one another.

17 Claims, 17 Drawing Sheets

Related U.S. Application Data a continuation-in-part of application No. 15/969,816, filed on May 3, 2018, now Pat. No. 10,518,518, which is a continuation-in-part of application No. 15/818,785, filed on Nov. 21, 2017, now abandoned, and a continuation-in-part of application No. 15/622,305, filed on Jul. 28, 2017, now Pat. No. 10,193,211, and a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086, said application No. 15/969,816 is a continuation-in-part of application No. 15/939,282, filed on Mar. 29, 2018, now Pat. No. 10,552,722, said application No. 15/969,816 is a continuation-in-part of application No. 15/939,281, filed on Mar. 29, 2018, now Pat. No. 10,733,494, and a continuation-in-part of application No. 15/358,138, filed on Nov. 22, 2016, now Pat. No. 9,960,476, which is a continuation-in-part of application No. 15/331,821, filed on Oct. 22, 2016, now abandoned, and a continuation-in-part of application No. 15/197,795, filed on Jun. 30, 2016, now Pat. No. 9,812,782, which is a continuation-in-part of application No. 14/551,376, filed on Nov. 24, 2014, now Pat. No. 9,390,364, said application No. 15/358,138 is a continuation-in-part of application No. 15/072,356, filed on Mar. 17, 2016, now Pat. No. 9,836,684, and a continuation-in-part of application No. 14/862,119, filed on Sep. 22, 2015, now Pat. No. 9,697,459, and a continuation-in-part of application No. 14/862,119, filed on Sep. 22, 2015, now Pat. No. 9,697,459, said application No. 15/358,138 is a continuation-in-part of application No. 14/619,170, filed on Feb. 11, 2015, now Pat. No. 9,634,391, and a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086, said application No. 14/492,113 is a continuation-in-part of application No. 13/744,686, filed on Jan. 18, 2013, now abandoned, said application No. 15/969,816 is a continuation-in-part of application No. 15/803,866, filed on Nov. 6, 2017, now Pat. No. 10,248,902, which is a continuation-in-part of application No. 14/551,376, filed on Nov. 24, 2014, now Pat. No. 9,390,364, said application No. 14/551,376 is a continuation-in-part of application No. 14/465,815, filed on Aug. 21, 2014, now Pat. No. 9,475,086.

(60) Provisional application No. 62/813,127, filed on Mar. 3, 2019, provisional application No. 62/538,711, filed on Jul. 30, 2017, provisional application No. 62/500,618, filed on May 3, 2017, provisional application No. 62/483,329, filed on Apr. 8, 2017, provisional application No. 62/403,148, filed on Oct. 2, 2016, provisional application No. 62/371,768, filed on Aug. 7, 2016, provisional application No. 62/039,562, filed on Aug. 20, 2014, provisional application No. 62/035,430, filed on Aug. 10, 2014, provisional application No. 62/475,208, filed on Mar. 29, 2017, provisional application No. 62/246,685, filed on Oct. 27, 2015, provisional application No. 62/371,768, filed on Aug. 7, 2016, provisional application No. 62/080,332, filed on Nov. 16, 2014, provisional application No. 62/061,689, filed on Oct. 8, 2014, provisional application No. 62/044,394, filed on Sep. 1, 2014, provisional application No. 62/300,906, filed on Feb. 28, 2016, provisional application No. 62/289,189, filed on Jan. 30, 2016, provisional application No. 62/281,209, filed on Jan. 21, 2016, provisional application No. 62/258,531, filed on Nov. 22, 2015, provisional application No. 62/204,466, filed on Aug. 13, 2015, provisional application No. 62/201,578, filed on Aug. 6, 2015, provisional application No. 62/175,308, filed on Jun. 14, 2015, provisional application No. 62/163,962, filed on May 19, 2015, provisional application No. 62/150,307, filed on Apr. 21, 2015, provisional application No. 62/136,644, filed on Mar. 23, 2015, provisional application No. 62/102,103, filed on Jan. 12, 2015, provisional application No. 62/088,598, filed on Dec. 7, 2014, provisional application No. 62/039,562, filed on Aug. 20, 2014, provisional application No. 62/035,430, filed on Aug. 10, 2014.

(58) Field of Classification Search
USPC .......................... 235/488, 487, 375
See application file for complete search history.

(56) References Cited

U.S. PATENT DOCUMENTS

| | | | |
|---|---|---|---|
| 5,029,797 A | * | 7/1991 | Levorchick .............. A63F 1/10 |
| | | | 248/459 |
| 5,581,065 A | | 12/1996 | Nishikawa et al. |
| 5,940,288 A | * | 8/1999 | Kociecki ............ H05K 7/20727 |
| | | | 363/144 |
| 5,955,723 A | | 9/1999 | Reiner |
| 6,233,818 B1 | | 5/2001 | Finn et al. |
| 6,378,774 B1 | | 4/2002 | Emori |
| 6,698,089 B2 | | 3/2004 | Finn et al. |
| 7,701,350 B2 | | 4/2010 | Sakama et al. |
| 8,100,337 B2 | | 1/2012 | Artigue et al. |
| 8,130,166 B2 | | 3/2012 | Ayala et al. |
| 8,261,997 B2 | | 9/2012 | Gebhart |
| 8,393,547 B2 | | 3/2013 | Kiekhaefer et al. |
| 8,474,726 B2 | | 7/2013 | Finn |
| 8,608,080 B2 | | 12/2013 | Finn |
| 8,608,082 B2 | | 12/2013 | Le Garrec et al. |
| 8,737,915 B2 | | 5/2014 | Beenken |
| 8,891,712 B2 | | 11/2014 | Sugiyama et al. |
| 9,033,250 B2 | | 5/2015 | Finn et al. |
| 9,165,240 B2 | | 10/2015 | Finn et al. |
| 9,195,932 B2 | | 11/2015 | Finn et al. |
| 9,203,157 B2 | | 12/2015 | Kato et al. |
| 9,272,370 B2 | | 3/2016 | Finn et al. |
| 9,390,364 B2 | | 7/2016 | Finn et al. |
| 9,390,366 B1 | | 7/2016 | Herslow et al. |
| 9,449,269 B2 | | 9/2016 | Finn et al. |
| 9,475,086 B2 | | 10/2016 | Finn et al. |
| 9,489,613 B2 | | 11/2016 | Finn et al. |
| 9,564,678 B2 | | 2/2017 | Kato et al. |
| 9,622,359 B2 | | 4/2017 | Finn et al. |
| 9,633,304 B2 | | 4/2017 | Finn et al. |
| 9,634,391 B2 | | 4/2017 | Finn et al. |
| 9,697,459 B2 | | 7/2017 | Finn et al. |
| 9,721,200 B2 | | 8/2017 | Herslow et al. |
| 9,798,968 B2 | | 10/2017 | Finn et al. |
| 9,812,782 B2 | | 11/2017 | Finn et al. |
| 9,836,684 B2 | | 12/2017 | Finn et al. |
| 9,852,369 B2 | | 12/2017 | Ali |
| 9,898,699 B2 | | 2/2018 | Herslow et al. |
| 9,960,476 B2 | | 5/2018 | Finn et al. |
| 10,089,570 B2 | | 10/2018 | Herslow et al. |
| 10,140,569 B2 | | 11/2018 | Kim et al. |
| 10,248,902 B1 | | 4/2019 | Finn et al. |
| 10,552,722 B2 | | 2/2020 | Finn et al. |
| 10,733,494 B2 | * | 8/2020 | Finn ................ G06K 19/07754 |
| 2003/0057288 A1 | | 3/2003 | Salzgeber |

(56) References Cited

U.S. PATENT DOCUMENTS

| | | |
|---|---|---|
| 2005/0194453 A1 | 9/2005 | Connor et al. |
| 2006/0232418 A1* | 10/2006 | Baba ................ G06K 19/07779 |
| | | 340/572.7 |
| 2009/0169776 A1 | 7/2009 | Herslow |
| 2010/0176205 A1 | 7/2010 | Patrice |
| 2011/0090058 A1 | 4/2011 | Ikemoto |
| 2011/0163167 A1 | 7/2011 | Artigue et al. |
| 2011/0181486 A1 | 7/2011 | Kato |
| 2011/0186641 A1 | 8/2011 | Kato et al. |
| 2011/0189620 A1 | 8/2011 | Herslow |
| 2012/0018522 A1 | 1/2012 | Le Garrec et al. |
| 2013/0126622 A1 | 5/2013 | Finn et al. |
| 2013/0146670 A1 | 6/2013 | Grieshofer et al. |
| 2013/0146671 A1 | 6/2013 | Grieshofer et al. |
| 2014/0159974 A1 | 6/2014 | Kato et al. |
| 2014/0166762 A1 | 6/2014 | Herslow |
| 2014/0263655 A1 | 9/2014 | Forster |
| 2015/0206047 A1 | 7/2015 | Slow et al. |
| 2015/0269474 A1 | 9/2015 | Finn et al. |
| 2016/0155041 A1* | 6/2016 | Ozaki .................. H01Q 1/2208 |
| | | 235/488 |
| 2018/0123221 A1 | 5/2018 | Finn et al. |
| 2018/0229877 A1* | 8/2018 | Este .......................... A61J 1/03 |
| 2018/0339503 A1 | 11/2018 | Finn et al. |
| 2018/0341846 A1 | 11/2018 | Finn et al. |
| 2018/0341847 A1 | 11/2018 | Finn et al. |
| 2019/0236434 A1 | 8/2019 | Lowe |
| 2019/0384261 A1 | 12/2019 | Nam et al. |

FOREIGN PATENT DOCUMENTS

| | | |
|---|---|---|
| EP | 2525304 | 11/2012 |
| EP | 2541471 | 1/2013 |
| EP | 2372840 | 9/2013 |
| KR | 10-1754985 | 7/2017 |
| WO | WO 2017/090891 | 6/2017 |

* cited by examiner

Dual Interface (DI) Smart Card, and Readers

Stacked Coupling Frames card body construction one slit extending to opening for TCM multiple slits extending to opening for TCM smart card with multiple metal layers shielded laminated smartcard two metal layers Network of an inductively coupled TCM and CF

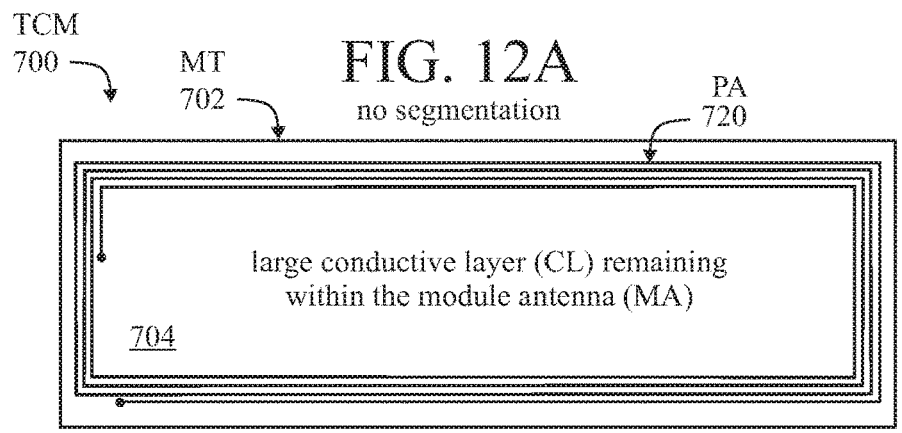
FIG. 12A no segmentation
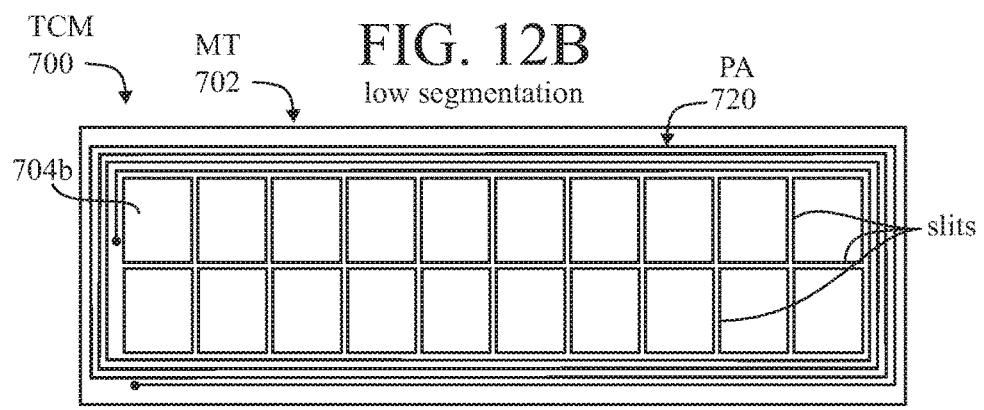
FIG. 12B low segmentation
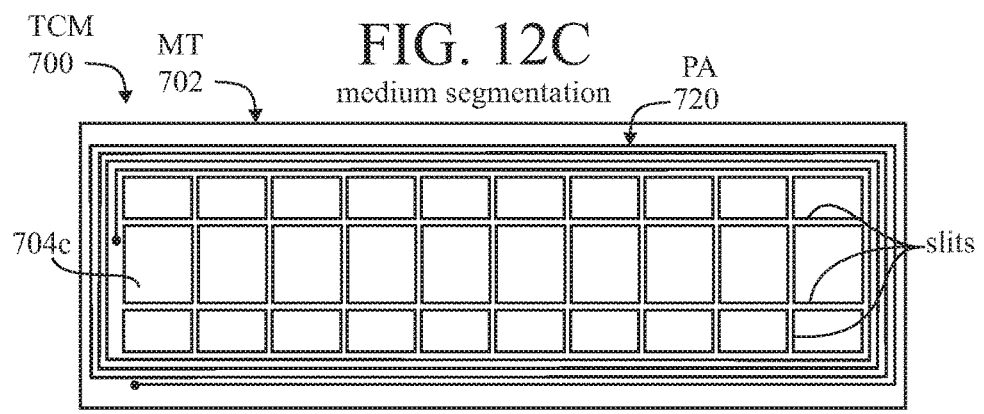
FIG. 12C medium segmentation
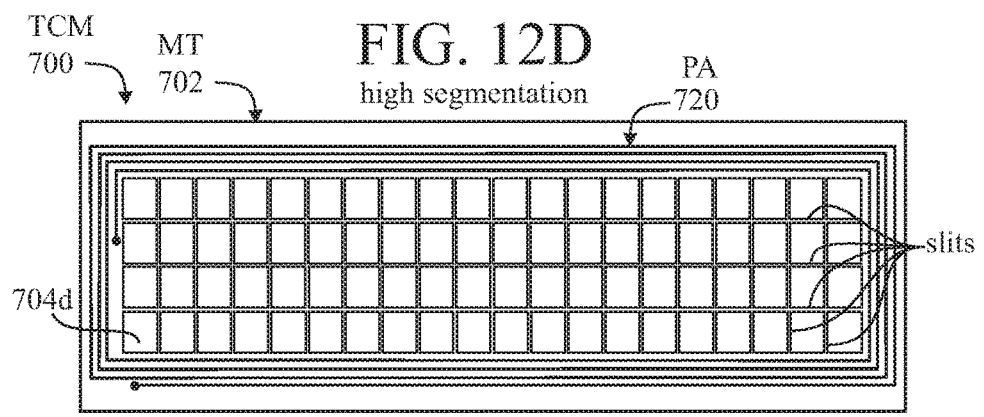
FIG. 12D high segmentation FIG. 17
(A) MO1 and S1 are laser cut, prior to laminating
TCM is installed after laminating and milling
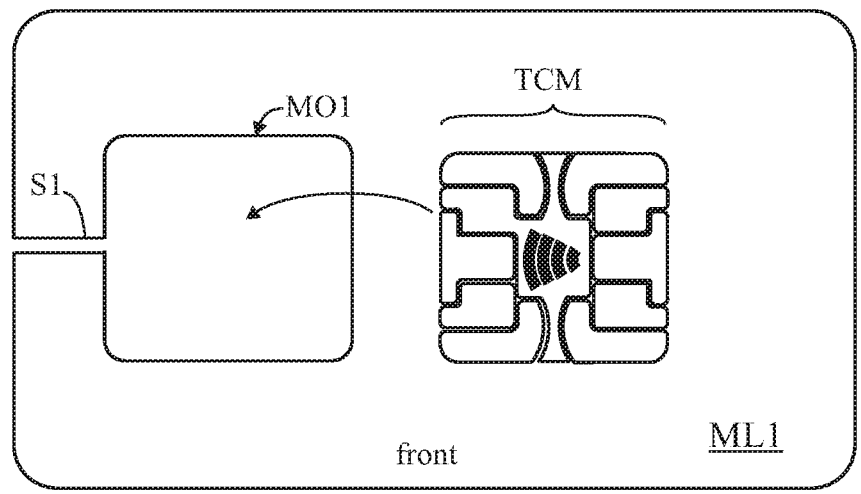
(B) MO2 is milled, after laminating
S2 is laser cut, prior to laminating
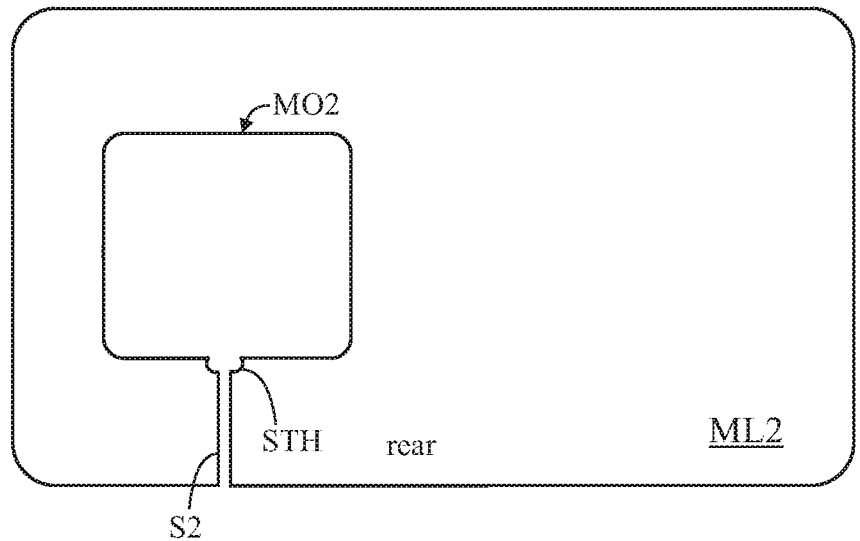

MANUFACTURING METAL INLAYS FOR DUAL INTERFACE METAL CARDS

CROSS-REFERENCE TO RELATED APPLICATIONS

This application claims priority (filing date benefit) as nonprovisional or continuation-in-part of the following US patent applications, incorporated by reference herein:

This is a continuation-in part of U.S. Ser. No. 16/729,530 filed 30 Dec. 2019

This is a nonprovisional filing of U.S. 62/813,127 filed 3 Mar. 2019

U.S. Ser. No. 16/729,530 is a continuation-in part of U.S. Ser. No. 15/969,816 filed 3 May 2018

U.S. Ser. No. 15/969,816 is a continuation-in-part of U.S. Ser. No. 15/818,785 filed 21 Nov. 2017

U.S. Ser. No. 15/969,816 is a non-provisional of U.S. 62/538,711 filed 30 Jul. 2017

U.S. Ser. No. 15/969,816 is a continuation-in-part of U.S. Ser. No. 15/662,305 filed 28 Jul. 2017

U.S. Ser. No. 15/662,305 is a nonprovisional of U.S. 62/500,618 filed 3 May 2017

U.S. Ser. No. 15/662,305 is a nonprovisional of U.S. 62/483,329 filed 8 Apr. 2017

U.S. Ser. No. 15/662,305 is a nonprovisional of U.S. 62/403,148 filed 2 Oct. 2016

U.S. Ser. No. 15/662,305 is a nonprovisional of U.S. 62/371,768 filed 7 Aug. 2016

U.S. Ser. No. 15/662,305 is a continuation-in-part of U.S. Ser. No. 14/492,113 filed 22 Sep. 2014

U.S. Ser. No. 14/492,113 is a continuation-in-part of U.S. Ser. No. 14/465,815 filed 21 Aug. 2014

U.S. Ser. No. 14/465,815 is a nonprovisional of U.S. 62/039,562 filed 20 Aug. 2014

U.S. Ser. No. 14/465,815 is a nonprovisional of U.S. 62/035,430 filed 10 Aug. 2014

U.S. Ser. No. 15/969,816 is a continuation-in-part of U.S. Ser. No. 15/939,282 filed 29 Mar. 2018

U.S. Ser. No. 15/939,282 is a nonprovisional of U.S. 62/478,589 29 Mar. 2017

U.S. Ser. No. 15/969,816 is a continuation-in-part of U.S. Ser. No. 15/939,281 filed 29 Mar. 2018

U.S. Ser. No. 15/939,281 is a nonprovisional of U.S. Ser. No. 62/478,208 filed 29 Mar. 2017

U.S. Ser. No. 15/939,281 is a continuation-in-part of U.S. Ser. No. 15/358,138 filed 22 Nov. 2016

U.S. Ser. No. 15/358,138 is a continuation-in-part of U.S. Ser. No. 15/331,821 filed 22 Oct. 2016

U.S. Ser. No. 15/331,821 is a nonprovisional of U.S. 62/246,685 filed 27 Oct. 2015

U.S. Ser. No. 15/358,138 is a nonprovisional of U.S. 62/371,768 filed 7 Aug. 2016

U.S. Ser. No. 15/358,138 is a continuation-in part of U.S. Ser. No. 15/197,795 filed 30 Jun. 2016

U.S. Ser. No. 15/197,795 is a continuation-in-part of U.S. Ser. No. 14/551,376 filed 24 Nov. 2014

U.S. Ser. No. 14/551,376 is a nonprovisional of U.S. 62/080,332 filed 16 Nov. 2014

U.S. Ser. No. 14/551,376 is a nonprovisional of U.S. 62/061,689 filed 8 Oct. 2014

U.S. Ser. No. 14/551,376 is a nonprovisional of U.S. 62/044,394 filed 1 Sep. 2014

U.S. Ser. No. 15/358,138 is a continuation-in-part of U.S. Ser. No. 15/072,356 filed 17 Mar. 2016

U.S. Ser. No. 15/072,356 is a nonprovisional of U.S. 62/300,906 filed 28 Feb. 2016

U.S. Ser. No. 15/072,356 is a nonprovisional of U.S. 62/289,189 filed 30 Jan. 2016

U.S. Ser. No. 15/072,356 is a nonprovisional of U.S. 62/281,209 filed 21 Jan. 2016

U.S. Ser. No. 15/072,356 is a continuation-in-part of U.S. Ser. No. 14/862,119 filed 22 Sep. 2015

U.S. Ser. No. 15/358,138 is a nonprovisional of U.S. 62/258,531 filed 22 Nov. 2015

U.S. Ser. No. 15/358,138 is a continuation-in-part of U.S. Ser. No. 14/862,119 filed 22 Sep. 2015

U.S. Ser. No. 14/862,119 is a nonprovisional of U.S. 62/204,466 filed 13 Aug. 2015

U.S. Ser. No. 14/862,119 is a nonprovisional of U.S. 62/201,578 filed 6 Aug. 2015

U.S. Ser. No. 14/862,119 is a nonprovisional of U.S. 62/175,308 filed 14 Jun. 2015

U.S. Ser. No. 14/862,119 is a nonprovisional of U.S. 62/163,962 filed 19 May 2015

U.S. Ser. No. 14/862,119 is a nonprovisional of U.S. 62/150,307 filed 21 Apr. 2015

U.S. Ser. No. 14/862,119 is a nonprovisional of U.S. 62/136,644 filed 23 Mar. 2015

U.S. Ser. No. 15/358,138 is a continuation-in-part of U.S. Ser. No. 14/619,170 filed 11 Feb. 2015

U.S. Ser. No. 14/619,170 is a nonprovisional of U.S. 62/102,103 filed 12 Jan. 2015

U.S. Ser. No. 14/619,170 is a nonprovisional of U.S. 62/088,598 filed 7 Dec. 2014

U.S. Ser. No. 15/358,138 is a continuation-in-part of U.S. Ser. No. 14/492,113 filed 22 Sep. 2014

U.S. Ser. No. 14/492,113 is a continuation-in-part of U.S. Ser. No. 14/465,815 filed 21 Aug. 2014

U.S. Ser. No. 14/465,815 is a nonprovisional of U.S. 62/039,562 filed 20 Aug. 2014

U.S. Ser. No. 14/465,815 is a nonprovisional of U.S. 62/035,430 filed 10 Aug. 2014

U.S. Ser. No. 14/492,113 is a continuation-in-part of U.S. Ser. No. 13/744,686 filed 18 Jan. 2013

U.S. Ser. No. 15/969,816 is a CIP of U.S. Ser. No. 15/803,866 filed 6 Nov. 2017

U.S. Ser. No. 15/803,866 is a continuation-in-part of U.S. Ser. No. 14/551,376 filed 24 Nov. 2014

U.S. Ser. No. 14/551,376 is a continuation-in-part of U.S. Ser. No. 14/465,815 filed 21 Aug. 2014

TECHNICAL FIELD

This disclosure relates to smartcards (or payment cards, secure documents, access control cards, electronic tickets, small form factor tags, data carriers, mobile payment devices and the like), operating at least in a contactless mode (ISO 14443 and NFC/ISO 15693). The smartcard may have a contact interface (ISO 7816). A smartcard having both contact and contactless interfaces (modes) may be referred to as a "dual interface" (DI) card.

BACKGROUND

A smartcard (SC, or smart card) may generally comprise:
- a card body (CB) having layers of plastic or metal, or combinations thereof; and
- a transponder chip module (TCM) disposed in the card body (CB).

The card body (CB) may be standard "credit card" size for identification cards as defined by ISO/IEC 7810, wherein the ID-1 format specifies a size of 85.60×53.98 mm, with rounded corners. A smartcard may include a card body (CB)

plus front and rear printed layers and clear overlay layers, and may have an overall thickness of 0.76 mm (760 µm).

The transponder chip module (TCM) (sometimes referred to as "antenna module", or simply "module") may comprise a module tape (MT) substrate, an RFID chip (IC) mounted to the module tape (MT), and a module antenna (MA) disposed on the module tape (MT). The module antenna (MA), for contactless operation/interface, may be disposed on the module tape (MT), on the same side of the module tape (MT) as the RFID chip (IC). Contact pads (CP), for contact operation/interface, may be disposed on an opposite side of the module tape (MT). A dual-interface module may operate by contact, or contactlessly. See, for example:

U.S. Pat. No. 9,489,613 8 Nov. 2016 (Finn, et al)
U.S. Pat. No. 9,165,240 10 Oct. 2015 (Finn, et al)
U.S. Pat. No. 8,474,726 2 Jul. 2013 (Finn, et al)

A typical transponder chip module (TCM) having 8 contact pads (CP) may measure 13.0 mm×11.8 mm Δ typical transponder chip module (TCM) having 6 contact pads (CP) may measure 8.0 mm×11 mm. These are conventional form factors for transponder chip modules (TCM) in smartcards (SC).

A booster antenna (BA) may be disposed in the card body (CB). The booster antenna (BA) may comprise wire mounted to (embedded in a layer of) the card body (CB) using an ultrasonic tool comprising a sonotrode and a capillary. See, for example U.S. Pat. Nos. 6,698,089 and 6,233,818. The wire may be non-insulated, insulated, or self-bonding wire, having an exemplary diameter in the range of approximately 50-112 µm.

The booster antenna (BA) may comprise various "components" (or portions, or elements), such as (i) a card antenna (CA) component extending around a peripheral area of the card body (CB), and (ii) a coupler coil (CC) component disposed at an interior area of the card body (CB) aligned around or below the module antenna (MA) of the transponder chip module (TCM), for coupling with the module antenna (MA) of the transponder chip module (TCM). The booster antenna (BA) may further comprise (iii) an extension antenna (EA) component extending across an interior area of the card body (CB). See, for example:

U.S. Pat. No. 9,633,304 25 Apr. 2017 (Finn, et al)
U.S. Pat. No. 9,449,269 20 Sep. 2016 (Finn, et al)
U.S. Pat. No. 9,195,932 24 Nov. 2015 (Finn, et al)
U.S. Pat. No. 9,033,250 19 May 2015 (Finn, et al)

A coupling frame (CF) may be disposed in the card body (CB), forming at least a portion of the card body (CB). The coupling frame (CF) may be approximately the same overall size (ID-1) as the card body (CB). The coupling frame (CF) may comprise a conductive metal layer (ML) with an opening (MO) for receiving a transponder chip module (TCM) disposed in the card body (CB).

The coupling frame (CF) may comprise an electrical discontinuity in the form of a slit (S) or non-conductive stripe (NCS), and may be disposed in the card body (CB) so that the slit (S) or nonconductive stripe (NCS) overlaps (or extends under) the module antenna (MA) of the transponder chip module (TCM). The slit (S) or non-conductive stripe (NCS) may extend from the opening (MO) to the periphery of the coupling frame (CF). In the main, hereinafter, when the term "slit" is used, it should be understood to include nonconductive stripe (NCS). The coupling frame (CF) may obviate (eliminate) the need for a booster antenna (BA), performing a function similar to that of a booster antenna (BA)—namely, facilitating or improving coupling between the transponder chip module (TCM) and an external contactless card reader (or terminal). See, for example:

U.S. Pat. No. 9,475,086 25 Oct. 2016 (Finn, et al)
U.S. Pat. No. 9,798,968 24 Oct. 2017 (Finn, et al)

The metal layer (ML) with slit (S) may constitute (form) nearly the entire thickness of the card body (CB), in which case the card body may be referred to as a "metal card body" (MCB). A metal card body (MCB) with a slit (S) may function as a coupling frame (CF). See, for example:

U.S. Pat. No. 9,836,684 5 Dec. 2017 (Finn, et al)

The card body (CB) may comprise multiple metal layers (ML1, ML2, etc.) layers, each having a slit (S1, S2, etc.) and functioning as a coupling frame (CF1, CF2, etc.). See, for example:

U.S. Pat. No. 9,697,459 4 Jul. 2017 (Finn et al)
U.S. Pat. No. 9,960,476 1 May 2018 (Finn et al)
U.S. Pat. No. 10,552,722 4 Feb. 2020 (Finn et al)

A capacitor may be connected across the slit (S) of the coupling frame. See, for example:

U.S. 20180123221 3 May 2018 (Finn, et al)

A coupling frame (CF)—i.e., metal layer having a slit—may be incorporated into the transponder chip module (TCM). In this case, the coupling frame (CF) may be smaller than the card body (CB), conforming to the conventional form factor of the transponder chip module (TCM), and the transponder chip module (TCM) may have a larger than usual form factor. Some examples of transponder chip modules (TCM) having coupling frames (CF) incorporated therein may be found at:

U.S. Pat. No. 9,390,364 12 Jul. 2016 (Finn, et al)
U.S. Pat. No. 9,812,782 7 Nov. 2017 (Finn, et al)

Some Patents and Publications of Interest

The following patents and/or publications ("references") may be of interest or relevant to the invention(s) disclosed herein, and some commentary may be provided to distinguish the invention(s) disclosed herein from the following references.

U.S. 2013/0126622 (23 May 2013, Feinics AmaTech) discloses offsetting shielding and enhancing coupling in metallized smart cards. As disclosed therein (FIG. 4A), a conductive "compensation loop" CL may be disposed behind the booster antenna BA, extending around the periphery of the card body CB. The compensation loop CL may be an open loop having two free ends, and a gap ("gap") therebetween. The compensation loop CL may be made of copper cladding.

It may be noted that the compensation loop (CL) of Feinics AmaTech is disposed below a booster antenna, and is sized accordingly. Typically, when a coupling frame (CF) is being used, there is no booster antenna. Moreover, the compensation loop (CL) does not overlap the antenna (MA) in the transponder chip module (TCM).

U.S. Pat. No. 8,608,082 (17 Dec. 2013; La Garrec et al.; Oberthur Technologies) discloses microcircuit device including means for amplifying the gain of an antenna. The electronic device (10) comprising a microcircuit (18) module (20), a near-field communication antenna (36) electrically connected to the microcircuit (18) of the module (20), delimiting an antenna surface (S), and a body (12) incorporating the module (20). More precisely, the antenna (36) is arranged within the module (20) and the body (12) incorporates means (40) of amplifying the gain of the antenna (36) comprising an electrically conductive element (42) electrically isolated from the microcircuit (18) and the antenna (36), of an annular general shape arranged around an area (R) of the body (12) forming a volume generated by the projection of the antenna surface (S) along a direction (Z) substantially orthogonal to the surface (S).

Oberthur's electrically conductive element (42) is analogous to a coupling frame (CF), and Oberthur's antenna (36) corresponds to a module antenna (MA). However, it should be noted that Oberthur's electrically conductive element (42) does not overlap the antenna. Rather, Oberthur goes to great lengths to clarify that there is NO overlap. For example, Oberthur states that [the] element 42 has . . . an annular general shape and is arranged so as to surround a region R of the body 12 constituting a volume generated by the projection of the antenna surface along a direction substantially orthogonal to the antenna surface S. Oberthur states that the metal layer can be the size of the card. Oberthur does not talk about a metal card body.

Oberthur's metal layer does not overlap the antenna structure of the transponder, nor does it consider such an overlap as being an enhancing factor: "In conformity with an embodiment of the invention, the element extends around the antenna outside of an area defined by the projection of the antenna along a direction substantially orthogonal to the antenna surface. Thus, the antenna and the ring must not extend facing one another so as not to mask the magnetic field flux through the antenna surface. In other words, the element extends outside the outer perimeter of the antenna in a plane parallel to that containing the antenna or part of the antenna, or possibly in the same plane. However, when the element extends within the same plane as the antenna or part of the antenna, a minimum spacing is provided between the element and the antenna to ensure electrical isolation."

EP 2372840 (25 Sep. 2013; Hashimoto; Panasonic) describes problems associated with a loop antenna used in a portable terminal, like a portable phone and a smart phone, in order to read information from a non-contact IC card and an IC tag and exchange information with a reader/writer. A metallic body 7 has a slit 17 that overlaps an antenna pattern 3 (FIGS. 8,9)

Panasonic does not disclose a smartcard. The antenna 3 is on a board 2, but there is no RFID chip on the board 2. There is no transponder chip module (TCM).

Moreover, in Panasonic, a magnetic sheet 4 appears to be critical. The magnetic sheet 4 is intended for lessening influence which arises when the metallic body is placed on the magnetic sheet 4. It is desirable that the magnetic sheet 4 shall completely cover the antenna pattern 3.

It should be noted that, according to some embodiments of the invention(s) disclosed herein, when using a coupling frame (CF), a magnetic sheet 4 is not required.

U.S. 2011/0181486 (28 Jul. 2011; Kato) discloses a wireless IC device includes a wireless IC chip arranged to process a radio signal, a feeder circuit board coupled to the wireless IC chip and including a feeder circuit, and a radiation electrode arranged at least one principal surface of the feeder circuit board. (Abstract) A wireless IC chip 5 is disposed on one (upper) side of a feeder circuit board 10 . . . A radiation electrode 30 is disposed on a lower surface of the feeder circuit board 10 to be electromagnetically coupled to the feeder circuit 20 and has two adjacent open ends 30a and 30b.

Kato discloses a board with a chip, and various radiation electrodes. However, it should be noted that Kato is not a smartcard. It does not have a card body, it does not have a transponder chip module with an RFID chip and an antenna. It does not have contact pads.

Some Additional References

U.S. 2014/0159974 (2014 Jun. 12, Kato et al; Murata), titled "Antenna device and method of setting resonant frequency of antenna device", describes an antenna device in which a coil conductor of an antenna coil module and a conductor layer at least partially overlap. A current flows in the conductor layer to block a magnetic field generated by a current flowing in the coil conductor. A current, which flows around the periphery of an opening of the conductor layer, flows along the periphery of a slit and around the periphery of the conductor layer due to a cut-edge effect. Since magnetic flux does not pass through the conductor layer, magnetic flux attempts to bypass the conductor layer along a path in which the conductor opening of the conductor layer is on the inside and the outer edge of the conductor layer is on the outside. As a result, the magnetic flux generates relatively large loops that link the inside and the outside of a coil conductor of an antenna on a reader/writer side. Reference is also made to U.S. Pat. No. 9,203,157.

It may be noted that claim 8 of U.S. Pat. No. 8,975,075 is derived from claim 7 which refers to a magnetic layer separating the coil and metal, in turn derived from claim 1, referring specifically to camera and antenna coil in alignment with a metal conductor in turn aligned to a phone case. U.S. Pat. No. 9,203,157 follows the same theme, with no mention of a smartcard. The applicant cites specific elements of a smartcard including contact pads and other metal elements (which can be interpreted as wire bonds, etc.). The Kato/Murata claim is dependent on the magnetic sheet between antenna and conductor. In the current invention, applicant is independent of shielding, and refers only to the conductor.

U.S. Pat. No. 9,564,678 (Murata), titled "Antenna device and method of setting resonant frequency of antenna device", describes an antenna device in that a coil conductor of an antenna coil module and a conductor layer at least partially overlap. A current flows in the conductor layer to block a magnetic field generated by a current flowing in the coil conductor. A current flows along the periphery of a slit and around the periphery of the conductor layer due to a cut-edge effect. Since magnetic flux does not pass through the conductor layer, magnetic flux attempts to bypass the conductor layer along a path in which the conductor opening of the conductor layer is on the inside and the outer edge of the conductor layer is on the outside. As a result, the magnetic flux generates large loops that link the inside and the outside of a coil conductor of an antenna on a reader/writer side to couple an antenna device and the antenna on the reader/writer side. See FIG. 6A therein.

U.S. Pat. No. 6,452,563 (Porte; Gemplus aka Gemalto) describes an antenna arrangement in a metallic environment which concerns an arrangement for an antenna (A) having the general shape of a loop, directly in the proximity of at least a metallic element (10). It is characterized in that each metallic element (10) comprises an orifice (18) arranged substantially opposite the surface defined by the antenna (A), and a slot (16) forming a gap width, arranged through the thickness of the metallic element (10), between the internal edge (21) delimiting the orifice (18) and the external edge (20) of said metallic element (10). It is applicable to scanners and radio frequency communication devices. See FIG. 2 therein.

U.S. Pat. No. 9,898,699 (Composecure) discloses a smart metal card with radio frequency (RF) transmission capability. Ferrite material utilized in a smart metal card as a shield between a metal layer and an antenna does not occupy a complete layer. Instead, only sufficient ferrite material is utilized to track and conform to the antenna.

U.S. Pat. No. 9,390,366 (2016 Jul. 12; Herslow et al.; Composecure) discloses a metal smart card with dual interface capability. A dual interface smart card having a metal layer includes an IC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. 2015/0206047 (Herslow, Composecure) discloses a smart card with a metal layer which can capture radio-frequency (RF) signals via an antenna system is made operable by modifying the metal layer to enable passage of RF signals through the metal layer and/or by introducing a ferrite layer to enhance the efficient reception/transmission of RF signals by the antenna system. In one embodiment apertures are formed in and through the metal layer to allow RF signals to pass through the metal layer without negatively impacting the decorative or esthetic and/or reflective nature of the metal layer. These modifications allow for dual interface and contactless smart card formats. In other embodiments of the invention, a ferrite layer is formed between the metal layer and the inductors/antennas mounted within the smart card to enhance the efficient reception/transmission of RF signals. Reference is also made to U.S. Pat. Nos. 9,721,200 and 10,089,570

WO 2017/090891 (Biosmart) titled "Non-contact type metal card having an antenna embedded therein" describes a non-contact metal card which is characterized in that a first body sheet and a second body sheet, which are formed of a metal flat plate, are vertically stacked, and an antenna inlay, which has an antenna, is disposed there-between. A hole is formed in a main body of each of the first body sheet and the second body sheet, and a slot is formed by incising a gap between one side surface of each hole and the side surface of the main body. The hole is positioned in the internal area of the antenna, and the locations of the hole of the first body sheet and the hole of the second body sheet have a gap of a predetermined distance. By the aforesaid structure, the non-contact type metal card has a hole of which a part of one side surface is opened by a slot on the main body which is a metal flat plate, and thus prevents an eddy current from occurring on the first body sheet and the second body sheet which are metal flat plates, thereby enabling the metal card to transmit and receive data in a wireless manner by using the antenna embedded therein.

KR 10-1754985 (Aichi CK Corporation, aka ICK) titled "Metal card having non-contact type card function and manufacturing method thereof" describes a non-contact metal card, for VIP customers in the most finest customer base, to provide the at least one side a metal card entirety having the contactless card function consisting of a real thick metal plate and a method of manufacturing the same, non-contact type which incorporates at least one chip function metal card (100) with the, RFIC chip module 20 for performing the contactless card function; inlay antenna for performing non-contact communication of the RFIC chip module (20) directly formed (40); wherein the RFIC chip module 20, and a chip module, the through hole 12 which can be inserted into the inlay (40) which can be mounted inlay mounting groove 11 is in the first metal layer (10); and wherein on the lower side of the first metal layer a second layer (60, 80) being laminated; includes, the first metal layer (10 and 10' is the chip module, the through hole 12 of one side) is to the outside a slit (15, 15', 85) to be opened there is formed, wherein in-let portion is characterized in that the conductivity of the first metal layer disconnection.

U.S. Pat. No. 10,140,569 (27 Nov. 2018; Kim et al.) describes a metal contactless smart card and method for fabricating the same, in which a metal contactless smart card includes a first metal layer having a first slit, a second layer, a radio-frequency integrated circuit chip module, and an inlay having an antenna. A nonconductive insert may be fitted in the slit. The first metal layer may include an inlay recess where the inlay may be received and a through-hole where the chip may be inserted. The second layer of the smart card may be made of metal and may also include a slit. See FIG. 1 therein.

U.S. Pat. No. 8,737,915 (27 May 2014; Beenken) describes identification devices having a contactlessly readable data carrier (20 equipped with an antenna (17), the antenna (17) assigned to the data carrier (20) is formed by an electrically conductive part of the identification device (10) with a slit (18) provided therein, making the antenna (17) an integral component of the identification device (10), and making a separate antenna (17) redundant.

SOME ADDITIONAL REFERENCES

The following US patents and patent application publications are referenced:

U.S. Pat. No. 9,960,476 Smart card constructions

U.S. Pat. No. 9,836,684 Smart cards, payment objects and methods

U.S. Pat. No. 9,697,459 Passive smart cards, metal cards, payment objects

U.S. Pat. No. 9,812,782 Coupling frames for RFID devices

U.S. Pat. No. 9,390,364 Transponder chip module with coupling frame on a common substrate U.S. Pat. No. 9,489,613 RFID transponder chip modules with a band of the antenna extending inward U.S. Pat. No. 9,634,391 RFID transponder chip modules U.S. Pat. No. 9,622,359 RFID transponder chip modules U.S. Pat. No. 9,798,968 Smartcard with coupling frame and method of increasing activation distance U.S. Pat. No. 9,475,086 Smartcard with coupling frame and method of increasing activation distance 2018/0341847 Smartcard with coupling frame antenna 2018/0339503 Smart cards with metal layers and methods of manufacture 2018/0341846 Contactless metal card construction

SUMMARY

It is a general object of the invention to provide techniques for improving coupling of smartcards with a contactless reader.

Some other objects may include providing techniques for improving coupling between different components of a smartcard (SC), such as between a coupling frame (CF) and an antenna module (AM).

Some other objects may include relaxing performance constraints on the booster antenna (BA) of the smart card (SC), if it has one, including the possibility of eliminating the booster antenna (BA) altogether.

The invention is generally directed to smartcards having at one metal layer (ML) provided with a discontinuity in the form of a slit (S) or nonconductive stripe (NCS) extending through the layer(s) so that the layer(s) can function as coupling frame(s) (CF). In the main, hereinafter, slits (S) may be discussed as representative of the discontinuity. Coupling frames (CF) may obviate the need for a booster antenna (BA).

Smartcards having only one metal layer which constitutes substantially the entire card body (CB) may be described. Such as layer or card body may be referred to as a metal card body (MCB).

Smartcards having two or more metal layers (ML1, ML2), each of which may be provided with a slit (S1, S2) to function as a coupling frame (CF1, CF2) may be described. Generally, these two (or more) layers should be separated by an insulating layer.

A stepped module opening (MO) in a metal embedded smartcard (plastic front/metal laminated core/plastic back) may be formed in the front plastic layer(s) and laminated metal core to accept the shape and dimensions of a transponder chip module (TCM). In general, the first step (P1) formed in the front plastic layer(s) and into the surface of the laminated metal core is a pocket to accept the thickness and shape of the chip carrier tape or module tape (CCT, MT) having a recess depth of approximately 250 µm. The laminated metal core may comprise two metal layers separated by a dielectric and having a total thickness of 350 µm. The second step (P2) formed in the plastic layer(s) and laminated metal core is dimensionally sized to match the assembly of the RFID die to the chip carrier tape (CCT, MT), by means of wire bonding or flip chip, and encapsulated with epoxy for environmental protection. The depth of the second step through the front plastic layer(s) and laminated metal core is approximately 610 µm, a pocket extending from the first recess (P1) into the card body to a depth of 360 µm.

In a metal embedded smartcard comprising a front plastic layer(s) and a rear plastic layer(s) sandwiching a laminated metal core comprising two metal layers (ML1, ML2) with slits (S1, S2) offset from one another to act as a coupling frame, the recess depth of P2 comes close to the rear plastic layer(s) of the card body. The metal layers are separated by a dielectric layer coated with adhesive. During CNC milling of P1 and P2, there may be smearing of the module pocket walls caused by ageing or dulling of the milling tool which results in an electrical short circuit between the first and second metal layer (ML1, ML2). In an embodiment of the current invention, the electrical short circuit which may be caused by CNC smearing at the interface of the metal layers may be avoided by laser cutting a module cavity (MC), or module opening (MO) in the first metal layer, thereby creating a clearance distance of approximately 0.5 mm between the steps P1 and the deep trench of P2.

Prior to CNC milling of the module opening (MO) to accept a transponder chip module (TCM), a module cavity (MC) is laser cut into the top metal layer of the inlay (consisting of a top metal layer, a dielectric layer and a bottom metal layer) before lamination. The dimensions of the module cavity (MC) are sized to be slightly greater than the lateral dimensions of the P2 pocket. The first step in CNC milling is to machine P1 which matches the contour dimensions of the front face plate of the module tape (MT) with contact pads (CP) and the second step is to machine P2 which is a pocket sized to accept the rear geometry of the transponder chip module (TCM). The intermediate step of laser cutting a module cavity (MC) in the top metal layer introduces a dimensional separation or clearance between the two metal layers before CNC milling.

To avoid CNC smearing of the narrow slit(s) at the module opening (MO) resulting in a short circuit across the slit(s), the area may be widened to end in a slit termination hole (STH). The slit termination hole may be of any geometry including but not limited to a circular hole, triangle, rectangle, trapezoid, or tapered rectangle. The slit termination hole may be located so as to intersect the cutting path of the CNC milling tool during formation, widening or finishing of the module opening (MO).

Generally, a metal layer (ML) or metal card body (MCB) functioning as a coupling frame (CF) may be provided with a module opening (MO) for accepting a transponder chip module (TCM) in the card body (CB, MCB) of the smartcard (SC). The opening (or recess) may be stepped or shaped so that the coupling frame (CF), or one or more layers thereof, may extend under the module antenna (MA) of the transponder chip module (TCM) so that the slit (S) of the metal layer (ML) or metal card body (MCB) overlaps the module antenna (MA) of the transponder chip module (TCM).

It should be understood that the module antenna (MA) of the transponder chip module (TCM) may be formed as a long spiral track having a number of turns on a module tape (MT) of the transponder chip module (TCM), and that there is a spacing between adjacent portions (or turns) of the track. Although there may only be one track, per se, reference may be made to spacing between tracks. The module antenna (MA) may be made by chemical or laser etching of a conductive foil on the module tape (MT) resulting in, for example, 10-15 turns, a track width of 100 µm and a spacing between tracks of approximately 20 µm. It should be understood that these, and other dimensions set forth herein may be exemplary, and are approximate, unless specified otherwise.

It should be appreciated that a metal layer (ML) or metal card body (MCB) functioning as a coupling frame (CF) should be electrically isolated from the module antenna (MA) of the transponder chip module (TCM). This may include insulation upon the module antenna (MA) itself. This may include providing an insulating layer (IL) between the coupling frame (CF) and the module antenna (MA). The insulating layer (IL) may comprise an adhesive layer, or tape, and may have a thickness of approximately 50 µm.

An electrically insulating conformal coating may be applied to the module antenna (MA) before placement in the card body in order to enhance the insulation. Alternatively, the insulating layer (IL) may be comprised of a laminate made from adhesive coatings on both sides of a freestanding insulating layer (e.g. plastic); this laminate may be used to attach the transponder chip module (TCM) to the card body and prevent the occurrence of short circuits. The thickness of the insulating layer (IL) may be kept to a minimum in order to maximize the electromagnetic coupling of the transponder chip module (TCM) with the coupling frame (CF).

U.S. Pat. No. 9,721,200 (1 Aug. 2017; Herslow, et al; Composecure) describes a smart card having an antenna structure and a metal layer. An insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

A method is described in Composecure which comprises forming said insulator layer, wherein the thickness of the insulator layer affects the value of the capacitance between said antenna structure and said metal layer; varying the thickness of the insulator for varying the capacitance; transmitting RF signals to the antenna structure (and insulating layer and metal layer); sensing the amplitude of the signals received at the antenna structure; and identifying the insulator thickness which results in the highest amplitude of signal being received at the antenna structure.

The ISO/IEC 14443 standard is an international standard for contactless smartcards operating at 13.56 MHz in close proximity (~10 cm) with the antenna of an external reader. This ISO standard describes the modulation and transmission protocols between the card and the reader to create interoperability for contactless smartcard products.

A reader is generally tuned to a frequency of 13.56 MHz. A transponder chip module (TCM) may similarly be tuned to a frequency of 13.56 MHz, or may be slightly offset therefrom to minimize interference with the reader.

As described in greater detail hereinbelow, the presence of the metallic coupling frame (CF), and other metallic components such as, but not limited to contact pads (CP) in the smartcard (SC) may upwardly shift (up-shift) the resonant (or resonance) frequency of the transponder chip module (TCM).

According to some embodiments (or examples) of the invention(s) disclosed herein, a frequency of the transponder chip module (TCM) may be set to a frequency lower than 13.56 MHz so that when it is up-shifted by the coupling frame (CF), or other metallic components, it is higher than 13.56 MHz. The lowered frequency of the module itself may be 13 MHz +/−0.3 (below the ISO spec); and the up-shifted frequency may be approximately 14 MHz (above the ISO spec).

Various techniques for affecting or modifying (such as lowering) the resonance frequency of the transponder chip module (TCM) itself are disclosed herein. Various techniques for modifying the coupling frame (CF), and other metallic components, taking into account their effect upon the resonance frequency of the transponder chip module (TCM) are disclosed herein. Various techniques for improving coupling between a transponder chip module (TCM) and an external reader, taking into account modifications to the transponder chip module (TCM) and the coupling frame (CF) and other metallic components, are disclosed herein.

According to the invention, generally, a "core" or "inlay" for a smartcard may comprise a first metal layer and a second metal layer, and may be formed by folding a single metal layer upon itself. A module cavity may be formed in the first metal layer by laser cutting, prior to laminating. An adhesive layer may be disposed between the two metal layers. A module opening may be formed in the second metal layer by milling, after laminating the first metal layer to the second metal layer. A slit in a metal layer may extend from an outer edge of the layer to the cavity or opening, thereby forming a coupling frame. The slit may have a termination hole at either end or at both ends of the slit. The slits of two metal layers may be positioned differently than one another.

According to an embodiment (or example) of the invention, a smartcard may comprise a single metal layer, folded to create a two layer metal inlay having a top (front, upper) metal layer and a bottom (rear, lower) metal layer. A layer of adhesive may be disposed between the top and bottom metal layers. The top metal layer may comprise a module cavity and a first slit extending from an outer edge of the top metal layer to the module cavity; and the bottom metal layer may comprises a module opening and a second slit extending from an outer edge of the bottom metal layer to the module opening. The module cavity in the top metal layer and the module opening in the bottom metal layer may be aligned with one another and of a different size than one another, with the module opening being larger than the module cavity, resulting in a "stepped" recess for receiving a transponder chip module having a "stepped" profile.

The smartcard may further comprise: a front overlay layer and a front graphic layer mounted with an adhesive layer to the top metal layer; and a rear overlay layer and a rear graphic layer mounted with an adhesive layer to the bottom metal layer.

The smartcard may further comprise: a top plastic layer disposed atop the top metal layer; and an adhesive layer disposed between the top and bottom metal layers; wherein:
the top plastic layer has a thickness of approximately 150 μm;
the top metal layer has a thickness of approximately 150 μm;
the adhesive layer has a thickness of approximately 50 μm;
the bottom metal layer has a thickness of approximately 150 μm;
the laminated metal core has a thickness of approximately 350 μm;
the module cavity has a depth of approximately 250 μm; and
the module opening has a depth of approximately 360 μm.

According to an embodiment (or example) of the invention, a method of manufacturing a metal core for a smartcard may comprise: providing a first metal layer; providing a second metal layer; providing an adhesive layer between the first and second metal layers; and laminating the first and second metal layers together to form the metal core; and may be characterized by: forming a first portion of a stepped opening in the first metal layer, wherein the first portion has a first thickness and shape; and forming a second portion of the stepped opening in the second metal layer, wherein the second portion has a second thickness and shape. The thickness and shape of the first portion of the stepped opening may correspond with a thickness and shape of a chip carrier tape of a transponder chip module; and the thickness and shape of the second portion of the stepped opening may correspond with a thickness and shape of an assembly and encapsulation of an RFID die to the chip carrier tape. Prior to laminating the first and second metal layers, fiducials may be formed in the first and second metal layers.

The first portion of the stepped opening may be formed by laser cutting a module cavity in the first metal layer; and the second portion of the stepped opening may be formed by milling a module opening in the second metal layer.

Front plastic overlay and graphic layers and rear plastic overlay and graphic layers may be laminated to the front and rear of the metal core, respectively. The module opening in the second metal layer may be milled after laminating the overlay and graphic layers to the (already laminated) metal core.

Prior to laminating the first and second metal layers, a first slit may be formed in the first metal layer, extending from an outer edge of the first metal layer to the module cavity; a second slit may be formed in the second metal layer extending from an outer edge of the second metal layer to a position of a not-yet-formed module opening in the second metal layer; and after laminating, milling may be performed to form the module opening in the second metal layer.

A first slit termination hole may be provided at at least one of an outer end of the first slit at the outer edge of the first metal layer and an inner end of the first slit at the module cavity; and providing a second slit termination hole may be provided at at least one of an outer end of the second slit at the outer edge of the second metal layer and an inner end of the second slit at the module opening. The slit termination hole at the inner end of the slit may provide protection against shorting of the slit by burrs, during milling. The slit termination hole at the outer end of the slit may provide protection against shorting of the slit by damage, such as bending or dropping the card.

The two metal layers may be formed from a single metal sheet, and may be "stacked" by folding one metal layer portion of the metal sheet atop the other metal layer portion of the metal sheet.

According to an embodiment (or example) of the invention, a smartcard may comprise: a metal layer having an outer edge, an opening for receiving at least a portion of a transponder chip module, and a slit extending through the metal layer from one end at the outer edge of the metal layer to another end at the opening; and the slit is wider at its outer edge end or its opening end.

The widening of an end of the slit may be accomplished by providing a termination hole at the outer edge end of the slit or at the opening end of the slit. The slit may have termination holes at both of its outer edge end and opening end. A termination hole may have a geometry selected from the group consisting of a circular hole, a triangle, a rectangle, a trapezoid, or a tapered rectangle.

The slit may vary in geometry along its length, may be angled, curved, wavy, etc.

Other objects, features and advantages of the invention(s) disclosed herein may become apparent in light of the following description(s) of embodiment(s) or example(s) thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be exaggerated, others may be omitted, for illustrative clarity. Some figures may be in the form of diagrams.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein. Some elements may be referred to with letters ("CCT", "CB", "CF", "MA", "MO", "MT", "S", "TCM", and the like), rather than or in addition to numerals.

FIG. 12A is a diagram (plan view) of an antenna structure (AS) which may be a module antenna (MA) in which a conductive layer (CL) which has been etched to have tracks (traces) separated by spaces, with a large area of the conductive layer (CL) remaining within the antenna structure (AS).

FIGS. 12B, 12C, 12D are diagrams (plan view) of antenna structures (AS) which have been etched to have tracks (traces) separated by spaces, with smaller, segmented areas of the conductive layer (CL) remaining within (in an inner area of) the antenna structure (AS).

FIG. 17 (A), (B) are diagrams (in plan view) of two metal layers of a smartcard.

CROSS-REFERENCING DRAWINGS (FIGS. 1-12 ONLY)

Figure 1:
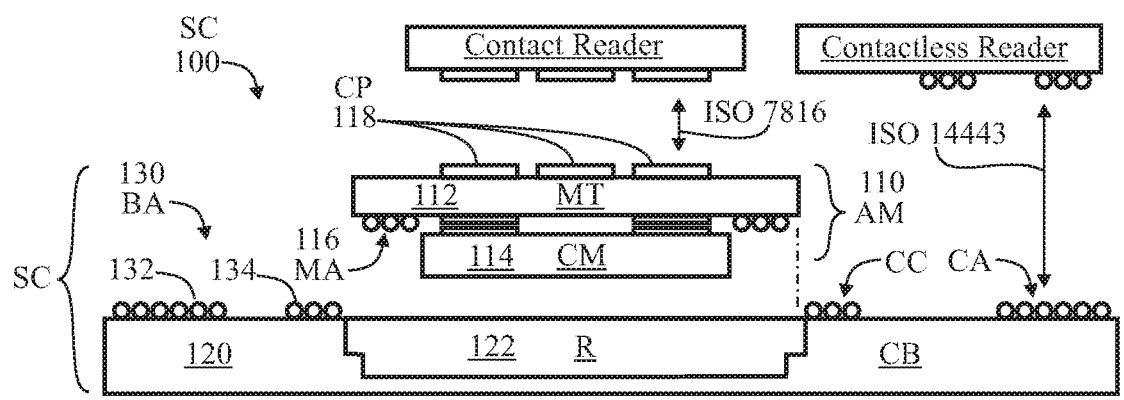
FIG. 1 is a diagram, in cross-section, of a dual-interface smart card (SC) and readers.

FIG. 1 herein may be comparable or similar to FIG. 1 of U.S. Pat. No. 9,475,086

Figure 2A:
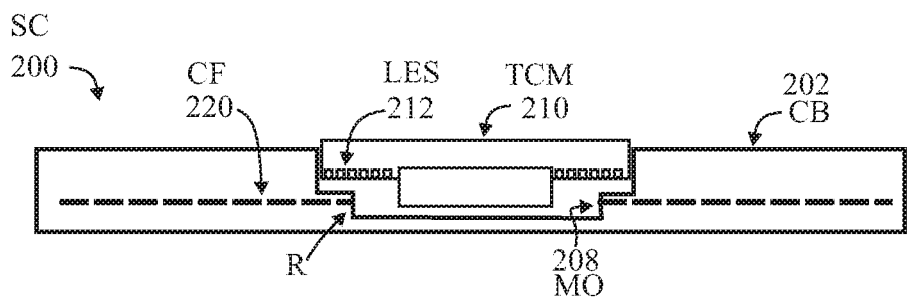
FIG. 2A is a diagram (cross-sectional view) illustrating a coupling frame in a card body of a smart card.
Figure 2B:
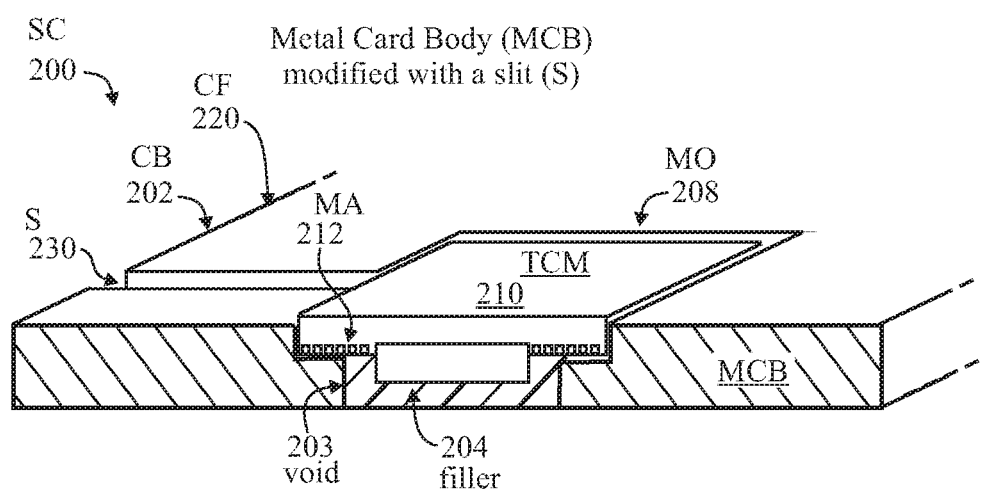
FIG. 2B is a diagram (partial perspective view) illustrating smart card having a metal card body modified to function as a coupling frame.
Figure 2C:
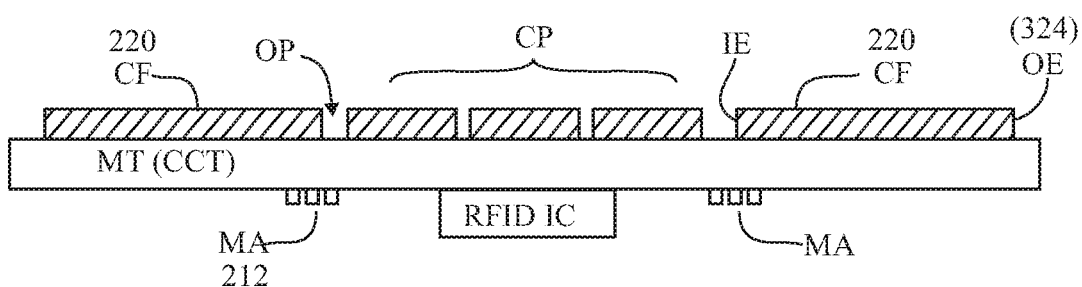
FIG. 2C is a diagram (cross-sectional view) illustrating a coupling frame integrated into a transponder chip module (TCM).

FIGS. 2A-C herein may be comparable or similar to FIGS. 2A-C of U.S. Pat. No. 9,836,684

Figure 3:
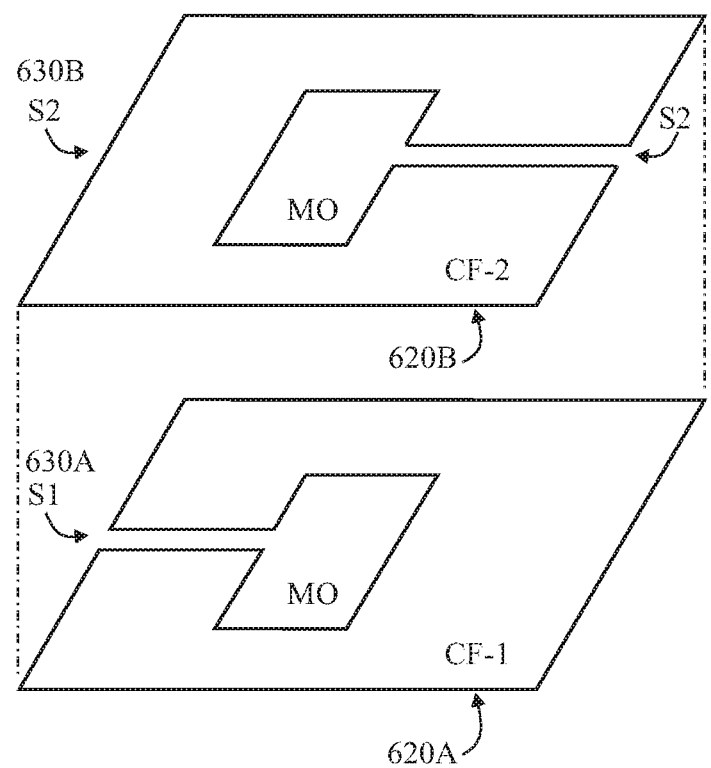
FIG. 3 is a diagram (in perspective view, exploded) of two coupling frames (CF-1, CF-2) stacked one atop the other.
Figure 6:
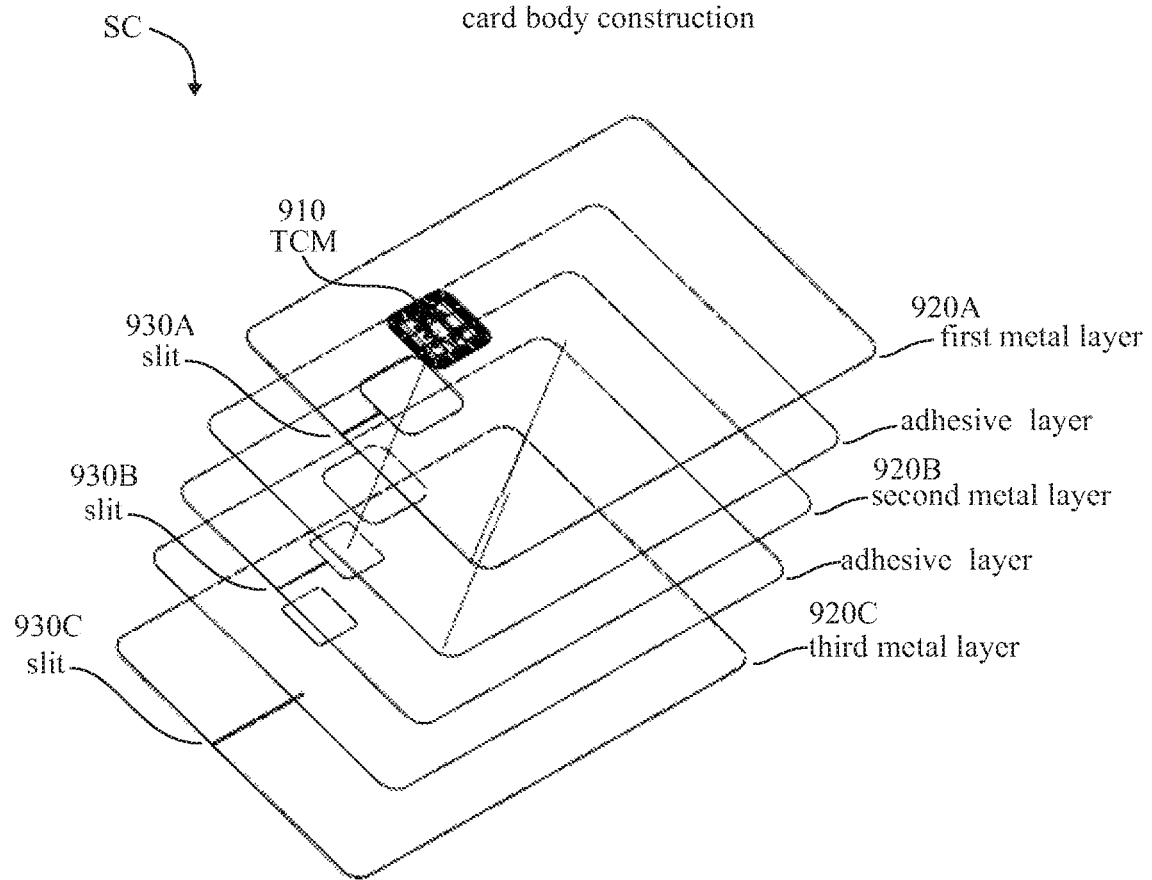
FIG. 6 is a diagram (perspective view, exploded) of a construction of a card body of a smart card.

FIG. 3 herein may be comparable or similar to FIG. 6 of U.S. Pat. No. 9,836,684

Figure 4A:
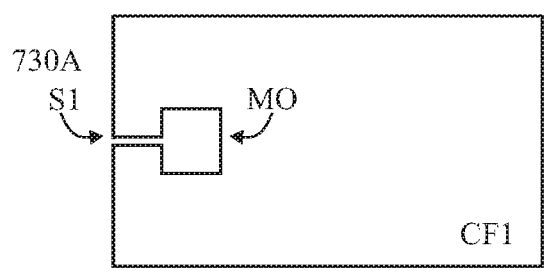
FIGS. 4A,B,C are diagrams (in plan view) showing two coupling frames (CF-1, CF-2) being joined together and overlapped.
Figure 7A:
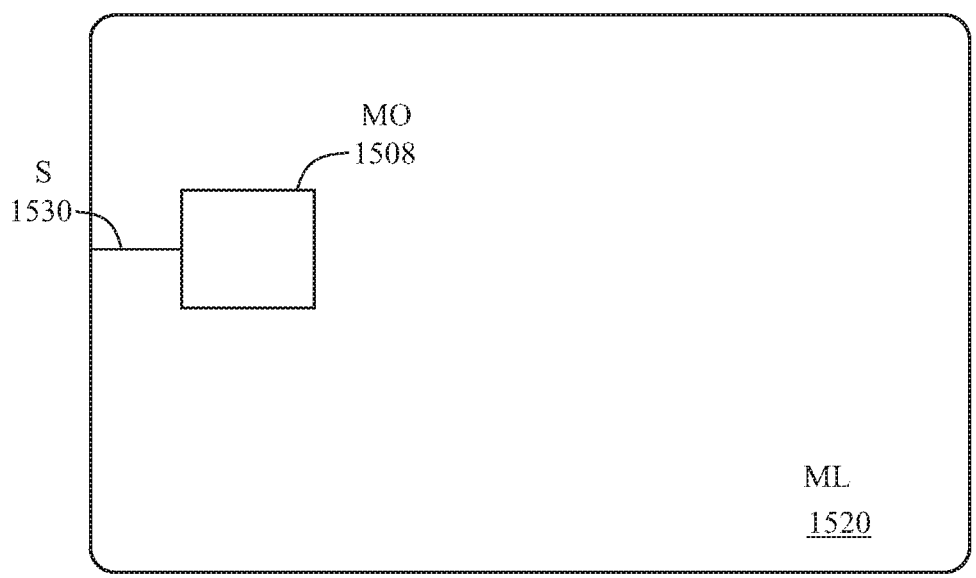
FIG. 7A is a diagram (plan view) showing a typical arrangement of a metal layer (or body) of a smartcard having a slit extending from an outer edge to an opening for a transponder chip module.

FIGS. 4A,B,C herein may be comparable or similar to FIGS. 7A,B,C of U.S. Pat. No. 9,836,684

Figure 5:
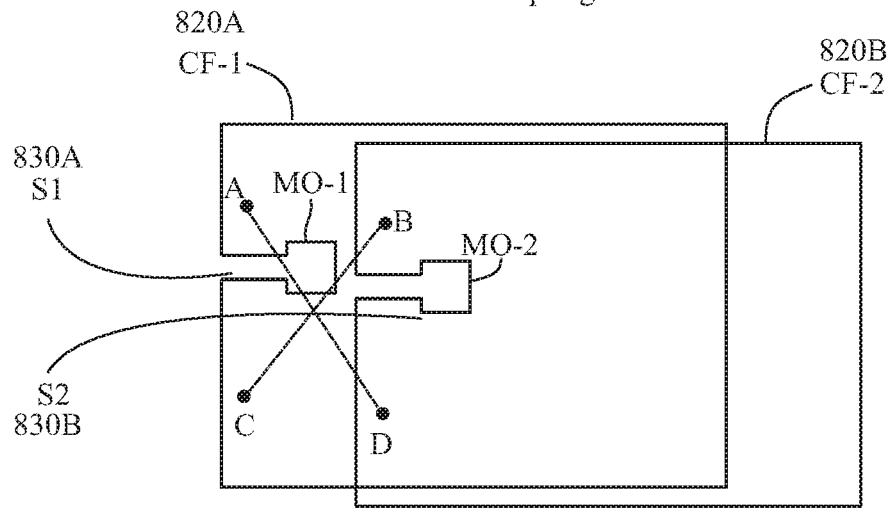
FIG. 5 is a diagram (plan view, exploded) showing two coupling frames (CF-1, CF-2) each having two ends, and illustrates alternative ways of connecting the ends of one coupling frame to the ends of the other coupling frame.

FIG. 5 herein may be comparable or similar to FIG. 8 of U.S. Pat. No. 9,836,684

Figure 9:
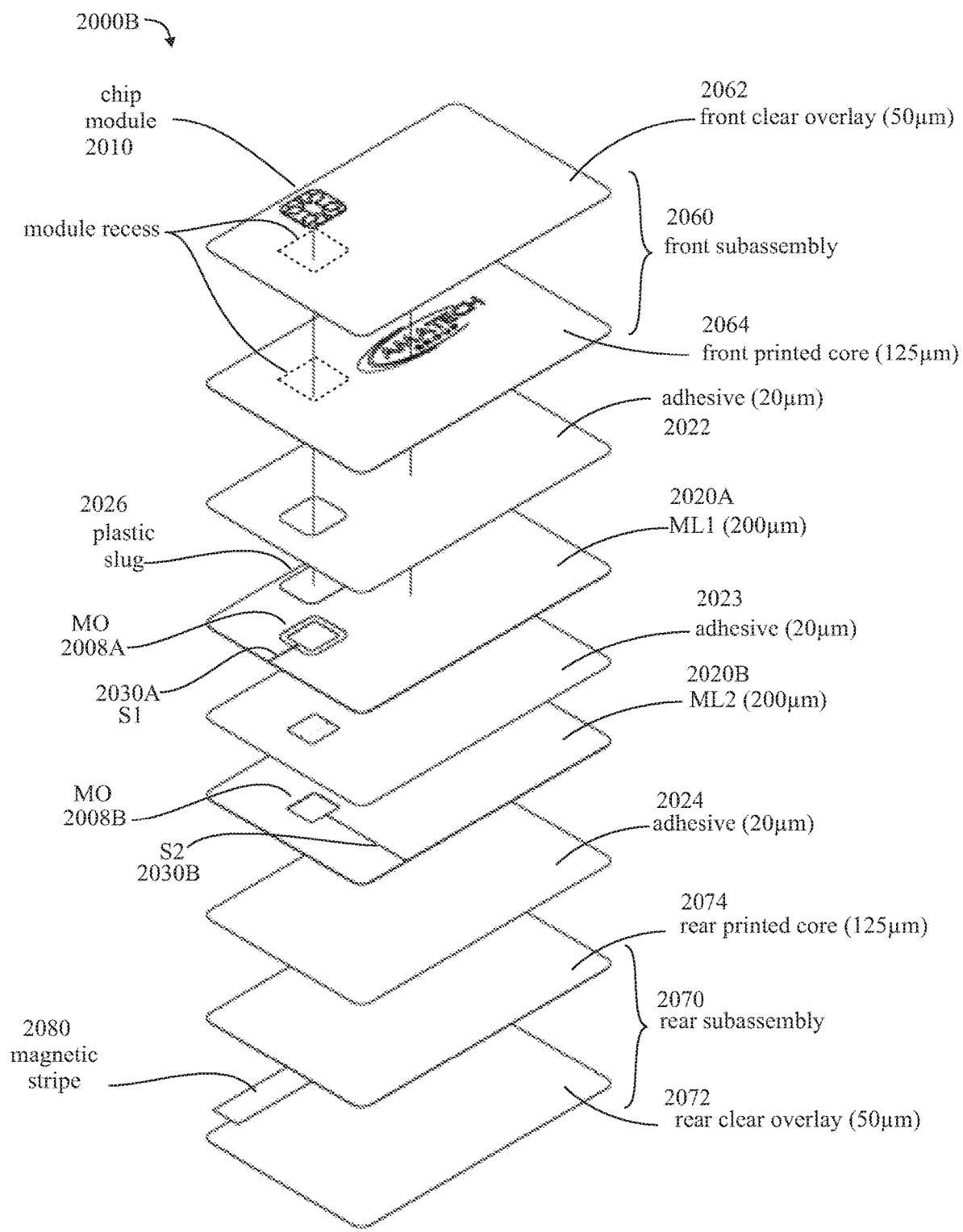
FIG. 9 is a diagram (exploded perspective view) of an alternate construction for a DIF "Plastic-Metal-Plastic" Hybrid Card, before lamination.

FIG. 6 herein may be comparable or similar to FIG. 9 of U.S. Pat. No. 9,836,684

FIGS. 7A,B herein may be comparable or similar to FIGS. 15A,B of U.S. Pat. No. 9,836,684

Figure 8A:
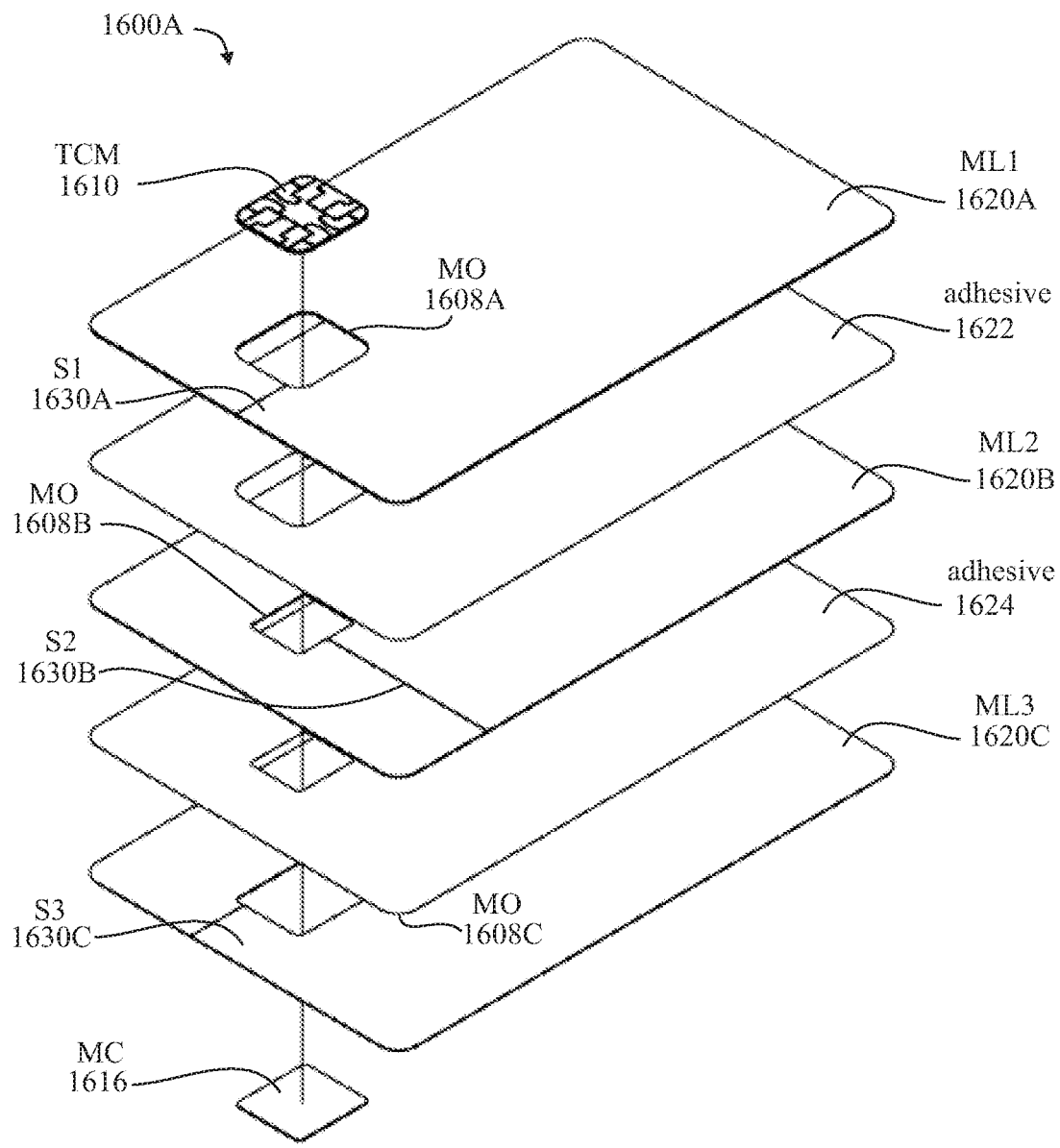
FIG. 8A is a diagram (exploded perspective view) of a metal laminated smartcard (RFID device).

FIGS. 8A,B herein may be comparable or similar to FIGS. 16A,B of U.S. Pat. No. 9,836,684

FIG. 9 herein may be comparable or similar to FIG. 20B of U.S. Pat. No. 9,836,684

Figure 11A:
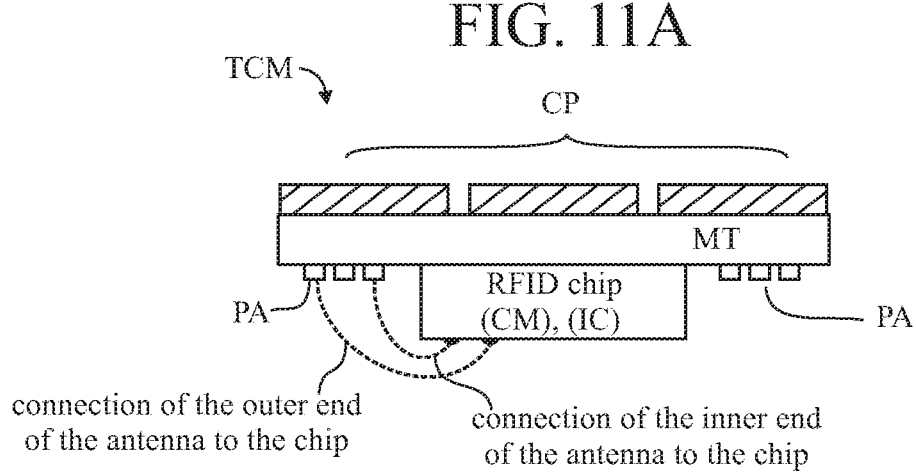
FIG. 11A is a diagram (cross-sectional view) of a dual-interface antenna module (AM) or transponder chip module (TCM).

FIGS. 11A,B herein may be comparable or similar to FIGS. 2A,B of U.S. Pat. No. 9,489,613 (or 20150269474)

FIG. 12A,B,C,D herein may be comparable or similar to FIG. 7A,B,C,D of U.S. Pat. No. 9,489,613 (or U.S. 20150269474) (also FIGS. 9AB,C,D of U.S. Pat. No. 9,390,364)

Figure 4B:
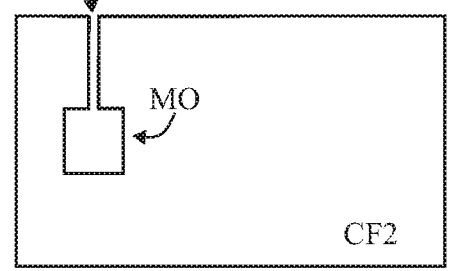
Figure 4C:
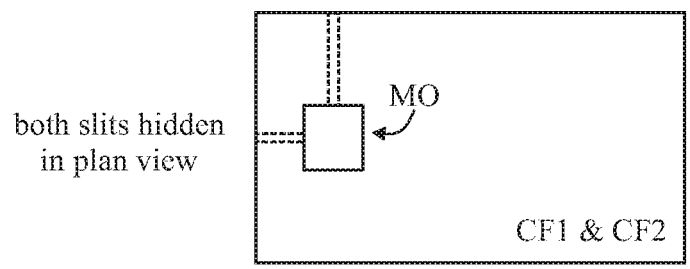

Some of the FIGS. 1-12 may have reference numerals from the drawings in the earlier applications—for example FIG. 3 reference numerals may be in the 6xx series, FIGS. 4A-C reference numerals may be in the 7xx series, etc.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader and should not be construed as limiting.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application.

The descriptions that follow are mostly in the context of dual interface (DI, DIF) smart cards, and relate mostly to the contactless operation thereof. Many of the teachings set forth herein may be applicable to pure contactless cards, tags, secure documents (e.g. electronic passports) and the like having only a contactless mode of operation.

Generally, any dimensions set forth herein are approximate, and materials set forth herein are intended to be exemplary. Conventional abbreviations such as "cm" for centimeter", "mm" for millimeter, "μm" for micron, and "nm" for nanometer may be used.

FIG. 1 is a diagram (cross-sectional view) of a conventional dual-interface smart card (SC), as exemplary of an RFID device, and external contact and contactless readers. The RFID device is "dual interface" since it can interact either with external contact readers (e.g., ISO 7816) or with external contactless readers (e.g., ISO 14443, 15693)—e.g., point-of-sale (POS) terminals.

FIG. 1 illustrates a smart card SC 100 in cross-section, along with a contact reader and a contactless reader. An antenna module AM (or transponder chip module TCM) 110 may comprise a module tape (MT) 112, an RFID chip (IC, or CM) 114 disposed on one side (face-down) of the module tape (MT) along with a module antenna (MA) 116 and contact pads (CP) 118 disposed on the other (face-up) side of the module tape MT for interfacing with an external contact reader. The card body (CB) 120 comprises a substrate which may have a recess (R) 122 extending into one side thereof for receiving the antenna module AM. The booster antenna BA 130 may comprise turns (or traces) of wire (or other conductor) embedded in (or disposed on) the card body CB, and may comprise a number of components such as (i) a card antenna (CA) component 132 and (ii) a coupler coil (CC) component 134. The module antenna (MA) and booster antenna (BA) cooperate to effect the contactless interface with the external contactless reader. Passive smartcards (i.e., smartcards not having an internal power source, such as a battery) may harvest energy from the RF field generated by the external reader, via the booster antenna (BA) and module antenna (MA).

The recess (R) for receiving the transponder chip module (TCM) in the card body (CB) may be "stepped", having a larger dimension at the front surface of the card to accommodate the module tape (MT) and contact pads (CP) of the transponder chip module (TCM), and a smaller dimension within the interior of the card to accommodate the RFID chip (IC) and a mold mass (MM, not shown) covering the RFID chip (IC) and wire bonds (WB, not shown) associated therewith.

It may be noted that, as a result of the recess (R) being stepped, a portion of the card body (CB) may extend under a portion of the antenna module AM, more particularly under the module antenna MA.

U.S. Pat. No. 9,033,250 shows embodiments of a booster antenna (BA) comprising a peripheral card antenna (CA) component which may have inner and outer windings (IW, OW), a coupler coil (CC) component at the location of the transponder chip module (TCM), and an extension antenna (EA) component (not visible in FIG. 1) in an interior area of the card body (CB).

FIG. 2A shows an example of a smart card 200 with a coupling frame (CF) 220 incorporated into its card body (CB) 202 which has a stepped recess (R). A transponder chip module (TCM) 210 has a planar antenna (PA) which may be a laser-etched antenna structure (LES) 212. The coupling frame (CF) has an opening (MO) 208 for receiving the transponder chip module (TCM). The coupling frame (CF) may have a slit (not visible) extending from the opening (MO) to an outer edge of the coupling frame (CF). The dashed line indicates, schematically, that the coupling frame may comprise a metal layer in a stackup of a card body. An inner edge of the coupling frame (CF) may overlap (or underlie) at least some outer turns of the module antenna (MA), which may be a planar antenna (PA) which is laser-etched antenna structure (LES) in the transponder chip module (TCM). Viewed from another perspective, an outer portion of the module antenna (MA may overhang an inner portion of the coupling frame (CF). The coupling frame (CF) may enhance communication between the transponder chip module and another RFID device such as a contactless reader. The transponder chip module may be dual-interface, supporting both contactless and contact communication with external readers.

FIG. 2B illustrates a transponder chip module (TCM) 210 disposed in the card body (CB) 202 of a metal smartcard (SC) 200, or metal card (MC), wherein substantially the entire card body (e.g., 760 µm thick) comprises metal, and may be referred to as a metal card body (MCB). The transponder chip module (TCM) may reside in an opening (MO) 208 extending completely through the card body. The opening may be stepped, having a larger area portion and smaller area portion, as shown. This may result in a void 203 behind the transponder chip module (TCM), and the void may be filled with non-conductive filler 204. In a conventional metal smart card (not having a slit to function as a coupling frame), the void behind the transponder chip module may allow electromagnetic radiation from an external reader to interact with the transponder chip module.

A slit (S) 230 extends from an outer edge of the metal card body (MCB) to the opening (MO) and may overlap (underneath, as viewed) an outer portion of the module antenna (MA) 212 which may be a laser-etched antenna structure (LES). Similarly, a slit may be provided through a metal layer of a hybrid smart card. The slit (S) modifies the metal card body (MCB) or layer, allowing it to operate as a coupling frame 220 to enhance contactless communication with the transponder chip module.

As shown in both FIGS. 2A, 2B, the coupling frame (CF) (metal layer, or metal card body) overlaps a portion of the module antenna of the transponder chip module.

It should be understood that many of the techniques described herein may be applicable to coupling frames having a slit, without a module opening. Depending on the geometry of the transponder chip module—for example, if there is no mold mass, and the module antenna is on an outermost surface of the module, or for other RFID device constructions—it may be possible that the metal element functioning as a coupling frame may have a slit extending to an interior position thereof, wherein said slit overlaps at least a portion of the module antenna.

FIG. 2C illustrates a transponder chip module 210 with an "integrated coupling frame". Contact pads CP for a contact interface (e.g., ISO 7816) may be disposed on the top (face-up) surface of the module tape (MT). An RFID chip (IC) and a module antenna MA 212 which may be a planar antenna PA are disposed on the bottom (face-down) side of a module tape MT. A coupling frame (CF) 220 having slit (S, not visible in this view) may be disposed on the module tape, such as on the face-up side thereof so the slit of the coupling frame may overlap at least some of the turns of the module antenna (planar antenna). In this example, the coupling frame has a opening (OP) for allowing the contact pads (CP) to be disposed on the same side of the tape as the coupling frame. If contact pads are not needed (e.g., for a contactless-only smart card), the area otherwise occupied by contact pads could be occupied by more of the coupling frame, resulting for example in an entire top surface of the smart card being covered by a layer of metal (except for the slit).

The example of FIG. 2C is included to illustrate the versatility of the coupling frame "slit technology"™ pioneered by the applicant. Applicant's slit Technology™ may be applied to various RFID devices, and is not limited to smartcards. For example, key fobs, wearables, etc.

Stacked and Overlapping Coupling Frames

FIG. 3 shows two coupling frames (CF-1) 620A and (CF-2) 620B disposed such that their slits (S1) 630A and (S2) 630B are oriented in different directions from one another. Here they are shown oriented 180° apart from one another. The two coupling frames may be stacked, one atop the other, with an insulating layer or film (not shown) disposed therebetween, such as an adhesive. (The insulating layer prevents the slit in a given one of the coupling frames from being shorted out by the other coupling frame.) The module openings (MO) of the two coupling frames may be aligned with one another to accept the antenna module (AM). When overlapped, the slits do not line up with one another. Coupling frames stacked in this manner and incorporated into an RFID device may not need a module opening.

FIGS. 4A,B,C show that a first coupling frame (CF-1) 720A may be overlapped with a second coupling frame (CF-2) 720B and still function with a transponder chip module (TCM). The coupling frames may be in contact (physically) and separated by a dielectric. The slits (S1) 730A and (S2) 730B of the coupling frames may be disposed in different directions, as shown. The coupling frames 720A and 720B may have an insulating layer (such as adhesive) between them. The module openings MO of the coupling frames should be overlapping with each other. The use of more than one coupling frame allows the slits to be concealed by having the slits at different positions on each coupling frame, when viewed in plan view there is no continuous slit penetrating the stack of coupling frames.

A given layer (or one of the coupling frames) may have a slit extending from its outer edge and extending inward to overlap the module antenna, but may not need an opening for the module itself. (The module may sit atop or beneath the layer with slit) some examples of coupling frames having slits, but no module openings, may be presented herein.

FIG. 5 is an exploded perspective view showing a first coupling frame (CF-1) 820A having two opposing end portions A & C separated by a slit (S1) 830A and a second coupling frame (CF-2) 820B having two opposing end portions B & D separated by a slit (S2) 830B. The slits S1 and S2 may be aligned with one another. Alternatively, the slits S1 and S2 may not be aligned with one another. The end portions A and B may be aligned with one another. The end portions C and D may be aligned with one another. The end portions of one coupling frame may be connected with the end portions of another coupling frame, in various combinations. The metal region to each side of the slit on two co-planar or overlapping coupling frames may be denoted by the letters A, B, C and D. Various connection options may be . . .

A connected with D, B connected with C (as illustrated).
A connected with D, B and D not connected
B connected with C, A and D not connected A connected with B, C connected with D
A connected with B, C and D not connected
C connected with D, A and B not connected The connection may be any form of electrical connection including soldered wire, plated through hole, wire bond, conductive adhesive, crimp, ribbon wire, etc. The use of different connection configurations may yield different resonant frequency values when the "composite" coupling frame (2 or more connected coupling frames) is paired with a suitable TCM. The use of multiple coupling frames can be used to increase communication performance of the device by tuning and/or by increasing the effective size of the coupling frame by electrically linking individual coupling frames that are spatially separated. This may be particularly relevant in the case of payment objects such as payment bracelets.

The technique of connecting ends of stacked coupling frames may be used to form a helical coupling frame having two or more "layers". For example, starting at A, go around CF-1, clockwise, to C. C connects with B in CF-2, continue around to D. D and A may be connected, or may be left unconnected, as free ends of the 2 layer helix.

FIG. 6 shows a card body construction for a smart card (SC). Typically, a metal card body would have an opening on the rear (back side) of the card body to allow contactless communication with a transponder chip module inside of the metal card. (The back side opening may also accommodate the size of the mold mass on the transponder chip module.) A dual-interface module would have contact pads on the front side, also blocking contactless communication with the chip module.

In this construction, there is a conventional recess (opening) extending into the front side of the card to accommodate a dual-interface transponder chip module (TCM), with its contact pads exposed. The card body construction may be layered, as follows:

- a first (top) metal layer, having a thickness of approximately 300 μm, and having an opening for receiving the transponder chip module and a slit 930A extending from the opening to an outer edge of the layer, so that the layer may function as a coupling frame 920A. The slit may extend entirely across no-man's land, and its width may be approximately equal to the width (or transverse height) of no-man's land;
- a layer of adhesive, having a thickness of approximately 20 μm;
- a second (middle) metal layer having a thickness of approximately 100 μm. The second metal layer may have an opening for the mold mass of the transponder chip module and a slit 930B extending from the opening to an outer edge of the layer, so that the layer may function as a coupling frame 930B. The module antenna of the chip module may reside on this layer, so that the slit overlaps the module antenna outside of the opening.
- a layer of adhesive, having a thickness of approximately 20 μm;
- a third (bottom) metal having a thickness of approximately 320 μm. The third metal layer may have a slit 930C extending from an interior position of the layer to the outer edge of the layer so that the layer may function as a coupling frame 920C. This layer does not need an opening for the chip module or mold mass. The slit overlaps (underlies) the module antenna.

Alternatively, this card body construction could be produced having only two layers of metal or even one layer of metal. The layers can be separated electrically by an adhesive or the layers can be welded together to form a homogenous conductive layer.

In an electromagnetic field generated by a point of sale terminal, the surface current around the slit may provide the power delivery to the chip by coupling the energy to the overlapping module antenna of the transponder chip module. The coupling may be a combination of capacitive and inductive coupling, i.e. reactive coupling.

FIG. 7A shows a typical arrangement of a metal layer (ML) 1520 (or metal card body MCB) of a smartcard 1500A having a slit (S) 1530 extending from an outer (left, as viewed) edge to an opening (MO) 1508 for a transponder chip module (TCM, not shown). As discussed herein, the metal layer may not have an opening for the transponder chip module (TCM), and the slit (S) should extend over (overlap) a portion (such as one side of) the module antenna (MA, not shown) of the transponder chip module (TCM). The slit (S) is shown extending from the left (as viewed) side of the smart card to the position of (or opening for) the transponder chip module (TCM). The slit (S) may have a width (vertical dimension in the figure) of approximately 50 μm, and may be positioned approximately halfway up (vertically) the transponder chip module (or opening therefore). The slit may vary in geometry (including width and trajectory) along its length and may be wider at the module opening or card edge. The metal layer (ML) may be approximately the same overall size as the smart card (SC). The slit (S) enables the metal layer (ML) to function as a coupling frame (CF). The slit (S) represents a mechanical weakness, and may lead to problems when the card is repeatedly flexed.

In some of the embodiments disclosed herein, a nonconductive stripe (NCS) may be substituted for the slit (S), to avoid the aforementioned mechanical weakness. A nonconductive stripe (NCS) may be formed in a metal layer by selectively anodizing an area of the metal layer comparable the area otherwise occupied by the silt (S). For example, aluminum is a conductor, aluminum oxide is not a conductor. A slit (S) or a nonconductive stripe (NCS) are both representative of an electrical discontinuity in the metal layer (or metal card body) forming the coupling frame.

Figure 7B:
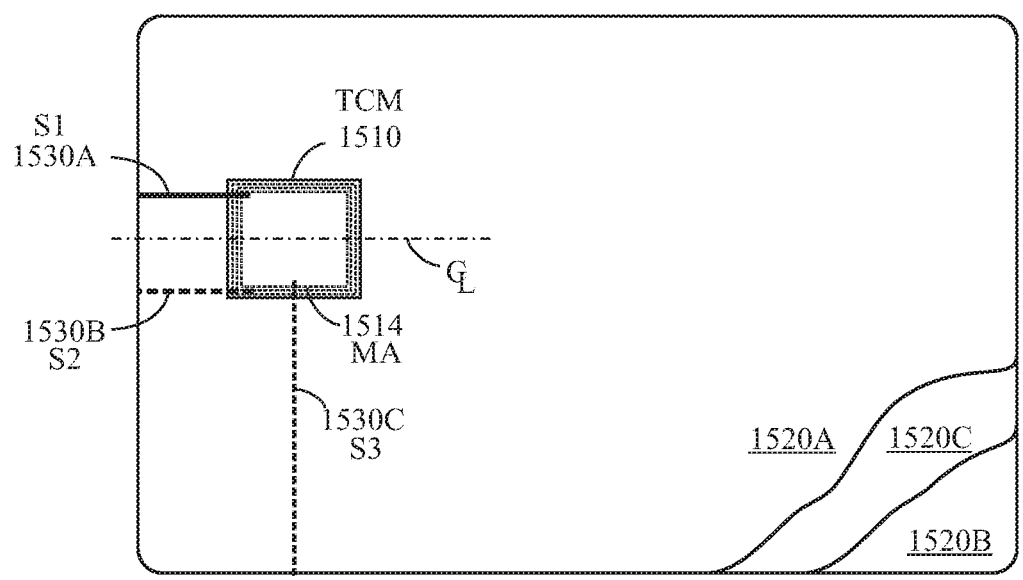
FIG. 7B is a diagram (plan view) showing arrangement where there are two metal layers, each having a slit extending from an outer edge to an opening for a transponder chip module, and the slits are offset from one another.

FIG. 7B is a diagram showing, schematically, an arrangement where there may be two or more metal layers in a smart card (or comparable RFID device), each layer having a slit extending from an outer edge to an opening for (or position of) a transponder chip module (TCM). In this illustration, the module antenna (MA) is indicated by dashed lines. The transponder chip module (TCM) may measure 11.8 mm high (vertical, as viewed)×13.0 mm wide (horizontal, as viewed).

A first slit S1 may be disposed in a first metal layer (ML1) of the smart card, extending from the left (as viewed) edge thereof to the position of the transponder chip module (TCM), overlapping the left (as viewed) side of the module antenna (MA). The slit (S1) may have a width of approximately 50 μm, and may be positioned towards the top of the transponder chip module (TCM), such as approximately 4.5 mm above a centerline (CL) of the transponder chip module (TCM). The slit (S1) may be straight, curved, meandering or angled.

A second slit S2 may be disposed in a second metal layer (ML2) of the smart card, extending from the left (as viewed) edge thereof to the position of the transponder chip module (TCM), overlapping the left (as viewed) side of the module antenna (MA). The slit (S2) may have a width of approximately 50 μm, and may be positioned towards the bottom of the transponder chip module (TCM), such as approximately 4.5 mm below a centerline (CL) of the transponder chip module (TCM). The slit (S2) may be straight, curved, meandering or angled. The slits S1 and S2 both extend from the position of the transponder chip module to the left edge of the card, but are offset from one another.

If the first metal layer (ML1) is a top layer of the smartcard (or other device), and the first slit may be visible to a user, a "fake" slit, or trench that does not extend completely through the metal layer (ML1) may be provided at the position of the second slit (S2) for aesthetic purposes. The trench may extend, for example only approximately 5-100 μm into a first (top) metal layer (ML1) that has a thickness of approximately 200-300 μm.

FIG. 7B also shows a third slit S3, which may be disposed in a third metal layer (ML3) of the smart card, extending from the bottom (as viewed) edge thereof to the position of the transponder chip module (TCM), overlapping the bottom (as viewed) side of the module antenna (MA). The slit S3 may have a width of approximately 50 μm. The slit S3 may be straight, curved, meandering or angled.

Other locations for slits in metal layers are possible, such as extending over the right (as viewed) or top (as viewed) sides of the module antenna (MA) from an outer edge of a metal layer, to function as a coupling frame (CF). The third metal layer (ML3) may be disposed between the first metal layer (ML1) and the second metal layer (ML2). Its slit (S3) may not be visible from either the front or back of the card.

The slits S1, S2 and S3 may all overlap a portion of the module antenna (MA) 1514, so that the metal layers M1, M2 and M3 may function as coupling frames. When these metal layers are laminated together, there is a non-conductive adhesive therebetween so that the slits do not become electrically shorted out. In subsequent descriptions of laminated card bodies, the second metal layer may be between the first and third metal layers.

Alternatively, the coupling frames (1520A,B,C) may be formed and arranged so that the slit of only one coupling frame overlaps the module antenna, and becomes dominant in coupling the external reader with the transponder chip module. The module openings of the other coupling frames may have larger module openings so that their slits do not overlap the module antenna.

An RFID device such as a smart card or key fob may comprise multiple metal layers, each layer having a slit or discontinuity extending from an outer edge thereof to a position corresponding to the location of a transponder chip module which may be an opening for accepting the transponder chip module, wherein the slit in one or more layers overlaps a module antenna of the transponder chip module and is located in a different position or orientation than the other slits so that the slits of the various layers are not aligned with one another.

A front metal layer may be included on the smartcard, and may be "continuous"—i.e., not having a slit or discontinuity—and may be shielded from the other metal layers by a shielding layer, such as containing ferrite.

FIG. 8A is a diagrammatic view of a metal laminated smart card (RFID device) 1600A, generally comprising (from top-to-bottom, as viewed):
  an 8 pin transponder chip module (TCM) 1610
  a first, top (front) metal layer (ML1) 1620A which may have a thickness of approximately 300 μm or 320 μm. A slit (S1) 1630A is shown extending from the left edge of the card to an opening (MO) 1608A for the transponder chip module (TCM). The front layer may comprise titanium.
  a layer of non-conductive adhesive 1622 which may have a thickness of approximately 20 μm (if the front layer is 320 μm). A thicker layer (40 μm) or two 20 μm layers of adhesive may be used if the front layer is 300 μm).
  a second, middle (inter-) metal layer (ML2) 1620B which may have a thickness of approximately 200 μm. A slit (S2) 1630B is shown extending from the bottom edge of the card to an opening (MO) 1608B for the transponder chip module (TCM). The inter-layer may comprise titanium.
  a layer of non-conductive adhesive 1624 which may have a thickness of approximately 20 μm
  a third, bottom metal layer (ML3) 1620C which may have a thickness of approximately 200 μm. A slit (S3) 1630C is shown extending from the left edge of the card to the opening for the transponder chip module (TCM). The bottom layer may comprise titanium.
  a module cover (MC) 1616 which may comprise a non-conductive material such as ceramic having a thickness of approximately 200 μm may be inserted into the opening in the bottom metal layer (ML3).

The bottom metal layer ML3 may not have an opening MO, but rather may simply have a position defined for the transponder chip module, and the slit S3 may extend into the position to overlap the module antenna. The cover (MC) may not be required.

In FIG. 8A (above) and FIG. 8B (below), it may be noted that the middle metal layer (ML2) has a smaller module opening than the other metal layers (ML1, ML3). In this manner, the slit (S2) of ML2 may overlap the module antenna in the TCM, while the slits (S1, S3) in the other metal layers do not overlap the module antenna. The various coupling frames may couple with one another, while the metal layer ML2 may dominate coupling between the coupling frame(s) and the module antenna of the transponder chip module.

Figure 8B:
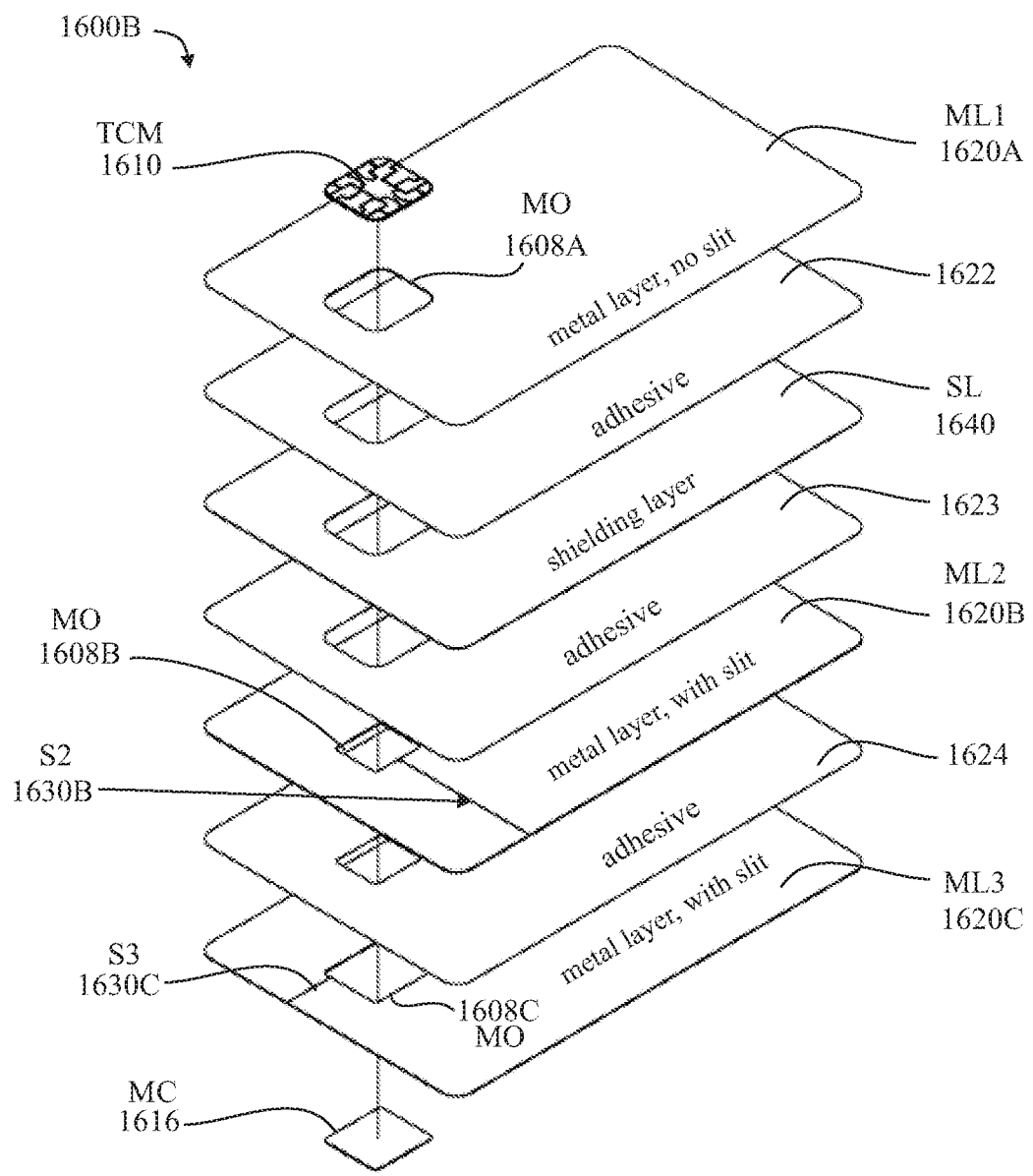
FIG. 8B is a diagram (exploded perspective view) of a shielded metal laminated smartcard (RFID device)

FIG. 8B shows a shielded, laminated metal smartcard (SC) 1600B having two coupling frame metal layers and a front face (ML1) which is a continuous metal layer (no slit). Some of the metal layers are the same (or similar) to those shown in the construction of FIG. 8A/16A. Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A, and the various layers may be held together (laminated) with layers of adhesive, as shown. The dimensions of the various layers may be similar to those in the construction of FIG. 16A.

The front face (ML1) 1620A, as shown, does not have a slit, and may interact with the reader's electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 μm may be disposed between the front metal layer ML1 and the shielding layer SL. A layer of adhesive 1623 having a thickness of 20 μm may be disposed between the shielding layer SL and the second metal layer ML2.

The front metal layer (ML1) may have a thickness of 200 μm, rather than 300 μm (or 320 μm) as in the construction of FIG. 8A/16A. The shielding layer (SL) may have a thickness of approximately 50-200 μm, such as 100 μm (which was gained by making the front layer thinner than in the construction of FIG. 8A/16A). In this manner the coupling frames will be shielded from the attenuating front metal layer and continue to function in conjunction with the transponder chip module (TCM).

Other elements of the FIG. 8B/16B embodiment, such as the second metal layer ML2 and third metal layer ML3 may be substantially similar or identical to corresponding (similarly numbered) elements in the embodiment of FIG. 8A/16A. Generally, the top metal layer ML1 of FIG. 8A/16A is replaced by a metal layer ML1 without a slit and a shielding layer SL.

The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved.

FIG. 9 is a diagrammatic view of an alternate construction of a DIF "Plastic-Metal-Plastic" Hybrid Card (RFID device) 2000B, before lamination. Generally, this embodiment differs from that of FIG. 20A in that the single metal layer (ML) 2020 having a thickness of approximately 400 µm is replaced by two metal layers (ML1, ML2) 2020A, 2020B each having a thickness of approximately 200 µm. There is a layer 2023 of adhesive between the two metal layers ML1 and ML2. More particularly, the card may comprise (from top-to-bottom, as viewed):

- a front clear overlay (plastic) layer 2062 which may have a thickness of approximately 50 µm. A recess or opening (shown in dashed lines "module recess") for accepting the module may be milled in this layer, after final lamination.
- a front (plastic) printed core layer 2064 (displaying the logo "AMATECH") which may have a thickness of approximately 125 µm. A recess or opening (shown in dashed lines) for accepting the module may be milled in this layer, after final lamination.
- the front clear overlay film with adhesive backing and front printed core may be adhesively attached together in sheet format and may constitute a front (plastic) subassembly (or plastic layer assembly) 2060.
- a layer of adhesive 2022 which may have a thickness of approximately 20 µm
- a first metal layer (ML1) 2020A which may have a thickness of approximately 200 µm and which may be provided with an opening (MO) 2008A extending through the metal layer. The metal layer may have a slit S (or a non-conductive stripe NCS) 2030A extending from the opening to an outer edge thereof so that the metal layer may function as a coupling frame (for a contactless interface).
- a layer of adhesive 2023 which may have a thickness of approximately 20 µm
- a second metal layer (ML1) 2020B which may have a thickness of approximately 200 µm and which may be provided with an opening (MO) 2008B extending through the metal layer. The metal layer may have a slit S (or a non-conductive stripe NCS) 2030B extending from the opening to an outer edge thereof so that the metal layer may function as a coupling frame (for a contactless interface).
- the openings MO 2008A and 200b in the metal layers ML1 2020A and ML2 2020B may be aligned with one another, and may be filled with a plastic slug 2026.
- a layer of adhesive 2024 which may have a thickness of approximately 20 µm
- a rear printed core 2074 which may have a thickness of approximately 125 µm. An opening or recess for the chip module may not be required in this layer.
- a rear clear overlay 2072 which may have a thickness of approximately 50 µm. An opening or recess for the chip module may not be required in this layer.
- a magnetic stripe may be disposed on the bottom (as viewed) surface of the rear clear overlay.
- the rear clear overlay film with adhesive backing and rear printed core (including magnetic stripe) may be attached together and may constitute a rear (plastic) subassembly (or plastic layer assembly) 2070.

It is an overall object of the invention(s) disclosed herein to improve the performance of a smartcard (SC) having a transponder chip module (TCM) comprising an RFID chip (IC) and a module antenna (MA), when using a coupling frame (CF) instead of a booster antenna (BA) in the card body (CB) of the smartcard (SC).

The transponder chip module (TCM) may be referred to simply as "module". Sometimes, the transponder chip module (TCM) may be referred to as "antenna module". The module antenna (MA) may be referred to simply as "antenna". (If there is no booster antenna, the module antenna may be the only/single antenna in the smartcard.)

Broadly, it is desirable to improve coupling between an external reader and the RFID chip (IC). This can be determined, for example, by measuring the activation distance of the card. Activation and read/write distances of at least a few centimeters (cm) are desirable. An activation distance of four centimeters is desirable, to meet ISO and EMV standards.

Generally, smartcards (SC) communicate with an external reader (reader) at a carrier frequency of 13.56 MHz. Refer to ISO/IEC 14443.

The coupling and interaction between the module antenna (MA) in the transponder chip module (TCM) and a booster antenna (BA) in the card body (CB) is relatively straightforward, and well understood.

A booster antenna (BA) may comprise three (3) individual antenna components—a card antenna (CA) component, a coupler coil (CC) component, and an extension antenna (EA) component—connected in series with one another. See, e.g., U.S. Pat. No. 9,033,250 S57. Such a booster antenna may have several resonant frequencies (i.e. ~15 MHz and 40 MHz). The resonant peak close to the carrier frequency is of importance for coupling with the module. Each of the three antenna components in the booster antenna, and the module antenna (MA), need to be designed and optimized to ensure correct frequency, capacitance, inductance, Q-factor and bandwidth for a particular module design.

The coupling and interaction between the module antenna (MA) in the transponder chip module (TCM) and a coupling frame (CF) in the card body (CB) is more complex, and less well understood.

U.S. Pat. No. 9,721,200 (1 Aug. 2017; Herslow et al.; Composecure) describes a smart card having an antenna structure and a metal layer. An insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

The resonant (or resonance) frequency of a transponder chip module (TCM) is nominally 13-14 MHz. This may be referred to as the "module frequency".

The coupling frame (CF) may be naturally resonant in the 2.4 GHz range. This may be referred to as the "coupling frame frequency".

Being made of metal (ML, MCB), it has been observed that the coupling frame (CF) has a frequency up-shifting effect of approximately +1 MHz on the transponder chip module (TCM) in the card.

It may therefore be desirable to tune the module frequency to an "artificially" low value, such as 13 MHz—in other words, lower than the ISO carrier frequency of 13.56 MHz—so that when it is up-shifted by the coupling frame, it will be closer to the carrier frequency.

The module frequency may be tuned through a combination of its input capacitance and the geometry of the antenna. Regarding the input capacitance, capacitor chips of various values may be selected, and incorporated into the module, including at the antenna terminals.

Regarding the antenna geometry, various factors may be controlled, such as:
  pitch
  track width
  number of windings
  resulting length of the antenna
  overall outer dimension (OD) of the antenna
  inner dimension (ID) of the antenna One or more of these antenna geometry factors may be modified to fine tune the frequency and electrical performance (inductance, bandwidth, etc.) of the antenna.

The coupling frame geometry also has an effect on the interaction between the coupling frame and the module, including the frequency up-shifting effect. Generally, various factors of the coupling frame may be considered, such as:
  the overall size of the coupling frame (CF), which is nominally the same as the overall size of the card body (e.g., ID-1)
  the size of the opening (MO) in the coupling frame
  the extent to which the coupling frame overlaps the module antenna—i.e., how many turns are overlapped as mentioned above, the thickness of an insulating layer between the coupling frame and the module antenna One of more of these factors may be used to optimize eddy currents generated in the CF to increase coupling with the module.

Broadly, using the techniques disclosed herein, the combination of an appropriately tuned module, and an appropriately tuned coupling frame, may result in an overall ~14 MHz system (TCM+CF), which has experimentally been shown to be an optimum frequency for performance Alternatively, the coupling frame, normally resonant in the gigaherz range, may be tuned to be closer to the megahertz range of the module so as to have less of an up-shifting effect on the module frequency.

The coupling frame can be tuned to the megahertz (MHz) range using a suitable capacitor connected across the slit (S). See, for example, U.S. 20180123221 S66c2. A capacitor having a value of approximately 5 nf, connected across the slit of the coupling frame, may bring the coupling frame into the megahertz range of the module. A surface mount capacitor may measure 0.5 mil, 0.2 mil, 0.1 mil, or smaller. This may have the effect of increasing power delivery into a module in the cavity (~20% increased read range over normal coupling frame). The coupling frame in this case behaves similarly to a simple booster antenna design (one antenna), and may be tuned to slightly above the carrier frequency. Such as "tuned" coupling frame may still up-shift the module antenna frequency, slightly, and the module may be fine tuned to compensate.

Changing the frequency of the coupling frame itself, to more closely match the frequency of the module (particularly the antenna thereof), may be considered to be a type of impedance matching. In electronics, impedance matching is the practice of designing the input impedance of an electrical load or the output impedance of its corresponding signal source to maximize the power transfer or minimize signal reflection from the load.

There may be a benefit to matching impedances between the reader and the card, as well as between the coupling frame and the module. However, the discussions set forth herein are primarily directed to establishing a frequency for the system of coupling frame plus module which is compatible with the nominal ISO carrier frequency of 13.56 MHz—in other words, optimizing the frequency of the combination of transponder chip module and coupling frame(s).

Some of applicant's coupling frame designs (and resulting card stackups) involve two or more coupling frames stacked one atop the other, with insulating layer(s) therebetween. For example, there may be three metal layers (ML-1, ML-2, ML-3), each provided with a slit (S1, S2, S3) to function as three coupling frames (CF-1, CF-2, CF-3), respectively.

FIG. 7B, described above, shows a smartcard having multiple (three) coupling frames. Typical thicknesses for three coupling frames may be 200 μm, 300 μm and 200 μm, respectively. Some of the coupling frames may have (MO) openings large enough to accommodate the transponder chip module, while only one of the coupling frames may have a smaller opening to facilitate overlap with the module antenna.

Coupling frames which do not overlap the module antenna may be compared with the compensating loop (CL) described, for example, in U.S. 20130126622. As disclosed therein (FIG. 4A), a conductive "compensation loop" (CL) may be disposed behind the booster antenna (BA), extending around the periphery of the card body (CB). The compensation loop (CL) may be an open loop having two free ends, and a gap therebetween. The compensation loop (CL) may be made of copper cladding. In contrast with the compensating loop, the coupling frames described herein are not aligned with and do not interact with a booster antenna, since there may be no booster antenna in the exemplary smartcard with coupling frame(s).

It has been experimentally determined that, when there are multiple (such as three) coupling frames, one of the three coupling frames may dominate over the others. Therefore, an analysis of the system comprising a single coupling frame and transponder chip module follows.

Figure 10:
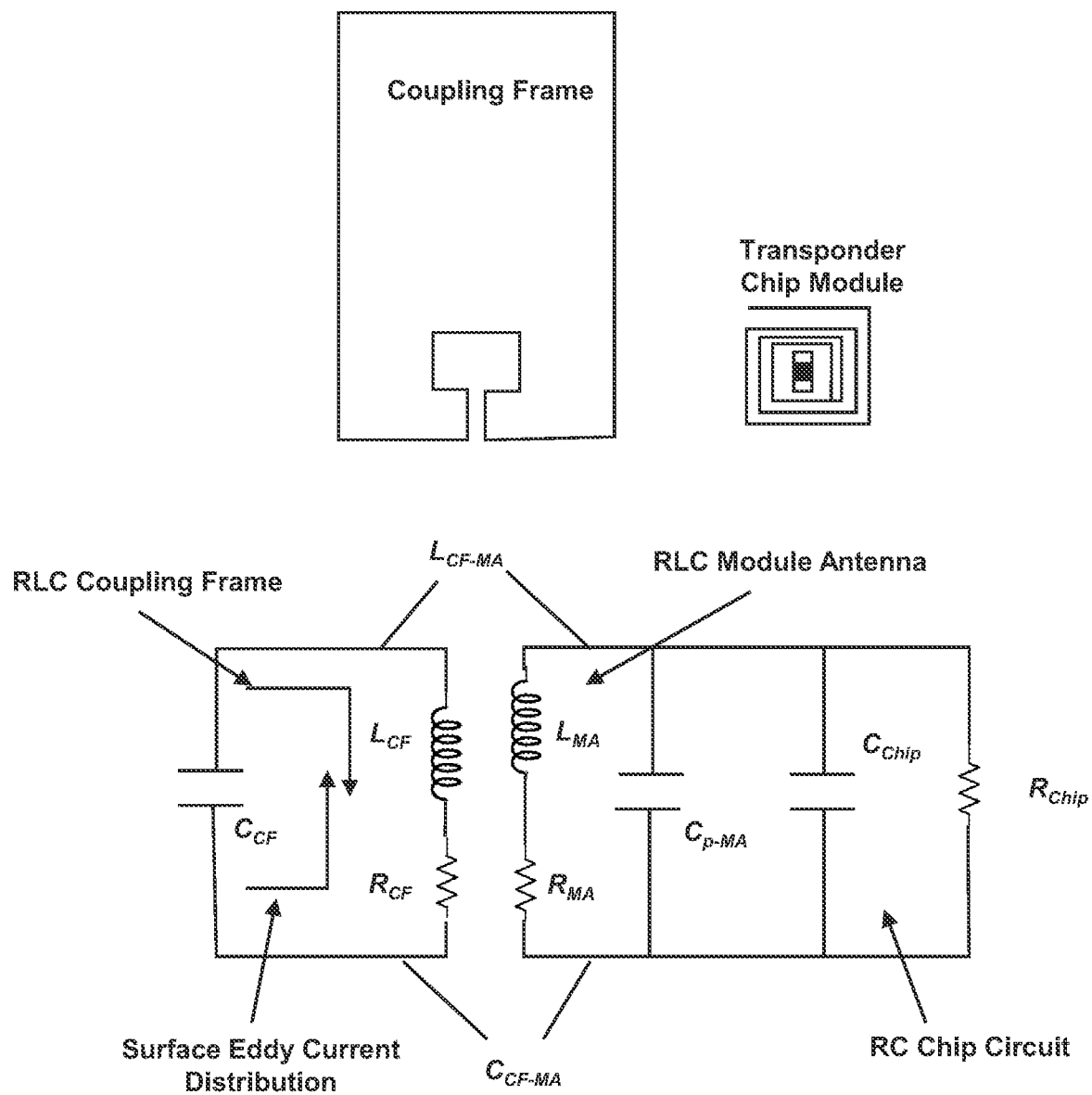
FIG. 10 herein is a schematic "equivalent circuit" diagram of an inductively coupled transponder chip module (TCM) and a coupling frame (CF).

FIG. 10 illustrates the schematic and equivalent RL C circuit diagram for a coupling frame (CF) inductively coupled with the RL C circuit of a module antenna (MA) connected to a RC chip circuit (CC) forming the transponder chip module (TCM), taking into consideration the respective mutual inductance and capacitance. The entire system is analogous to a discreet wire transformer with a primary coil (CF) sized similar to the size of an ID-1 card (85.60 mm×53.98 mm) and a secondary coil (MA) sized similar to that of a standard 8 contact pad chip module (13.0 mm×11.8 mm), connected to an RFID chip circuit (CC). A 6 contact module may measure 8 mm×11 mm.

The main role of the coupling frame may be to act as a matching transformer, inductively coupling the magnetic flux penetrating its relatively large area (~46 cm²) to the module antenna via the opening (MO) and the slit (S). The resulting circulating loops of eddy current distribution has maximum at the free edges of the opening in the coupling frame.

From experiments, the characteristic resonance frequency of the coupling frame circuit is high, in the low GHz region (~2.4 GHz), while the resonance frequency of the module is set slightly below the carrier frequency (~13.5 MHz).

For efficient energy transmission to the transponder chip module, the combined resonance frequency of the coupling frame and the module antenna connected to the RFID chip ought to be set close to or slightly higher than the carrier frequency of 13.56 MHz, such as at ~14.1 MHz.

By adjusting parameters of the coupling frame and/or transponder chip module (with particular attention to the module antenna thereof), coupling between the smartcard and the external reader may be improved, with consequent improvements in activation distance, efficiency of energy harvesting, etc.

Generally, optimizing the frequency of the combination of transponder chip module and coupling frame may be achieved, as follows.

Firstly, the frequency of the transponder chip module should be set lower, such as 1 MHz lower than the ISO carrier frequency (13.56 MHz), such as at less than 13 MHz, bearing in mind that this frequency will be up-shifted when the module is in proximity with a coupling frame. This may be achieved by altering the geometry of the module antenna, as follows:

- minimizing the inside dimension (ID) of the antenna. This may be limited by the size of the RFID chip (approximately 3 mm×3 mm), and its surrounding connections.
- maximizing the outside dimension (OD) of the antenna. This may be limited by the overall size of the module. A 6 contact pad module may measure 8 mm×10.6 mm An 8 contact pad module may measure approximately 12.6 mm×11.4 mm.
- for a planar etched antenna, selecting an appropriate line (track) width, and appropriate spacing between tracks. A typical line width may be 100 μm. A typical spacing between tracks may be 20 μm.
- selecting an appropriate number of turns for the antenna. Nominally, there are 11-15 turns.
- selecting an appropriate technique for etching a planar antenna (PA)—i.e., chemical etching, laser etching, or a combination thereof. See, e.g., U.S. Pat. No. 9,272,370
- selecting an appropriate length for the antenna, which will be dependent upon the available space (OD minus ID), track width and spacing
- each turn of the antenna may add approximately 0.7 MHz to the module frequency. The frequency may also be adjusted by the track width.
- connecting a capacitor across the antenna. A typical value may be 50 pf.

In addition to the techniques described hereinabove, attention may be directed to selecting a preferred distance between the coupling frame and the module antenna, such as disclosed in U.S. Pat. No. 9,721,200. The distance between the coupling frame(s) and the module antenna may be approximately 50 μm.

Other factors which may be considered, selected, and optimized may include, but are not limited to:

- selecting a preferred dimension (width) for the slit (S). Generally, bigger may be, but aesthetically a smaller slit may be preferred. A slit width of 60 μm is currently being used.
- selecting a preferred overlap for the coupling frame and the antenna. Rather than overlapping all 11-15 turns of the antenna, it may be preferred to overlap only approximately half (e.g., 5) of the turns. This is tied to the inner dimension (ID) of the coupling frame.
- selecting a preferred size for the module opening (MO) of the dominant coupling frame. This is essentially the inner dimension (ID) of the coupling frame.
- connect a capacitor (C) across the slit. See U.S. Pat. No. 10,248,902 (2 Apr. 2019; Finn et al). A value in the range 100-1000 pf may be appropriate.
- selecting an appropriate location along the slit (S) for connecting the capacitor
- an LED may be connected across the slit. See U.S. Pat. No. 9,475,086. The LED may be energized in the presence of the RF field of a reader. The slit may be filled with a material that lights up when the card is being energized.
- in stackups having multiple (such as three) coupling frames (CF1, CF2, CF3), the slits (S1, S2, S3) it is important to ensure that the slits are not aligned with one another, for reasons of mechanical integrity. The slits may be oriented in different directions, emanate from different sides of the module, may intersect (cross over) each other, diverge from one another, etc. Although only one of the multiples coupling frame may be dominant (with regard to matching or up-shifting the antenna frequency), the size and shape of the slits in the various coupling frames may be influential.
  In FIG. 7B, the slit S1 extends from an upper position of the module opening to the left side of the card, the slit S2 extends parallel to S1 from a lower position of the module opening to the left side of the card, and the slit S3 extends perpendicular to S1 and S2 from a bottom of the opening to a bottom of the card. An alternative may be having one slit (S1) extending from the bottom left corner of the module opening to the bottom left corner of the card, and another slit (S2) extending from the top left corner of the module opening to the top left corner of the card.
- selecting appropriate thicknesses for the coupling frame (s), although within the range of a few hundred microns, adjusting the thickness of the coupling frame (s) appears to not have a significant impact on coupling or up-shifting, etc.
- a coupling frame may be formed with overlapping ends, such as disclosed in FIG. 4 of U.S. Pat. No. 9,697,459. This concept may be extended to form a helical coupling frame having two or three (or more) "layers". Such a helical coupling frame may be formed from a tape having an 18 μm copper layer on a 100 μm backing.
- ends of two coupling frames may be "cross-connected" with one another, such as shown in FIG. 5.

Applicant has determined that a suitable combination (or "system") of coupling frame(s) and transponder chip module exhibiting a resonant frequency peaking at 13.9-14.2 MHz couples well with the reader. It is generally beneficial if the resulting module frequency is offset from the reader frequency (13.56 MHz), to avoid interference.

The frequency of the module itself (sans coupling frame) may be adjusted (set) to be ~13 MHz +/−0.3, and then up-shifted by the coupling frame(s), employing one or more of the techniques disclosed hereinabove. This lowered module frequency is in contrast with off-the-shelf modules, which are typically tuned to be higher than the ISO carrier frequency of 13.56 MHz, such as at approximately 14 MHz.

Some Additional Considerations

It should be understood that a manufacturer of smartcards, or components thereof, may receive a bare RFID chip (IC) and fabricate the transponder chip module (TCM). Separately, the card body (CB) may be manufactured, and prepared to receive the transponder chip module (TCM), such as by milling the recess (R) in the card body (CB). Ultimately, the transponder chip module (TCM) may be installed in the card body (CB).

The card body (CB), as mentioned above, may comprise various layers of plastic and metal, may comprise a booster antenna (BA) or coupling frame (CF). The card body may be a metal card body (MCB).

The transponder chip module (TCM) may comprise a module tape (MT), plus the RFID chip (IC), plus the module antenna (MA), plus (for dual-interface modules) the contact pads (CP). As discussed above, a metallic coupling frame (CF) may cause the resonance frequency of the transponder chip module (TCM) to be upwardly shifted, and accommodations may be made for the upward shift in frequency when designing the transponder chip module (TCM), such as by lowering the resonance frequency of the module. Similarly, the metallic contact pads (CP) of a dual-interface module may cause an upward shift in frequency, which may be accommodated by further lowering the resonance frequency of the module. The up-shift in resonance frequency of the module from the contact pads may be approximately 1 MHz, so the module (without contact pads) may be designed to operate at a lower (−1 MHz) frequency to accommodate the upward shift in frequency.

U.S. 20150269474 (2015 Sep. 24; Finn et al) discloses a method of forming a planar antenna (PA) for a transponder chip module (TCM) comprising:

etching a conductive layer (CL) in a rectangular spiral pattern having a track exhibiting a number of turns and having a plurality of traces separated by spaces; and segmenting the conductive layer in an area within an interior of the pattern to have a plurality of relatively small isolated conductive structures, rather than one large conductive structure.

FIG. 11A shows an antenna module (AM) or transponder chip module (TCM) comprising contact pads (CP) disposed on one side (or surface; top, as viewed) of a module tape (MT, or substrate) and a planar antenna (PA, or module antenna MA) and an RFID chip (CM, IC) disposed on the opposite side (or surface; bottom, as viewed) of the module tape (MT). The planar antenna (PA) is disposed around the RFID chip (CM, IC). The planar antenna (PA) has two ends—an inner end disposed interior to the planar antenna (PA) (towards the RFID chip), and an outer end disposed exterior to the planar antenna (PA). The inner end of the planar antenna (PA) may be connected directly (or via interconnect traces on the face-down side of the module tape (MT)) to a terminal (such as "LA") of the RFID chip (IC, CM). However, the other, outer end of the planar antenna (PA) must "cross over" the planar antenna (PA) in order to be connected with a second terminal (such as "LB") the RFID chip (IC, CM). This can be done with interconnect traces on the face down (bottom, as viewed) side of the module tape (MT). Alternatively, as will be seen in subsequent figures the outer end of the planar antenna (PA) structure may connected, through the module tape (MT) to an outer end of a connection bridge (CBR) disposed on the face up (top, as viewed) side of the module tape (MT), the connection bridge (CBR) can extend to a position corresponding to the interior of the planar antenna (PA) structure, and a connection can be made from the inner end of the connection bridge (CBR), through the module tape (MT) to a second terminal of the RFID chip (IC, CM).

Figure 11B:
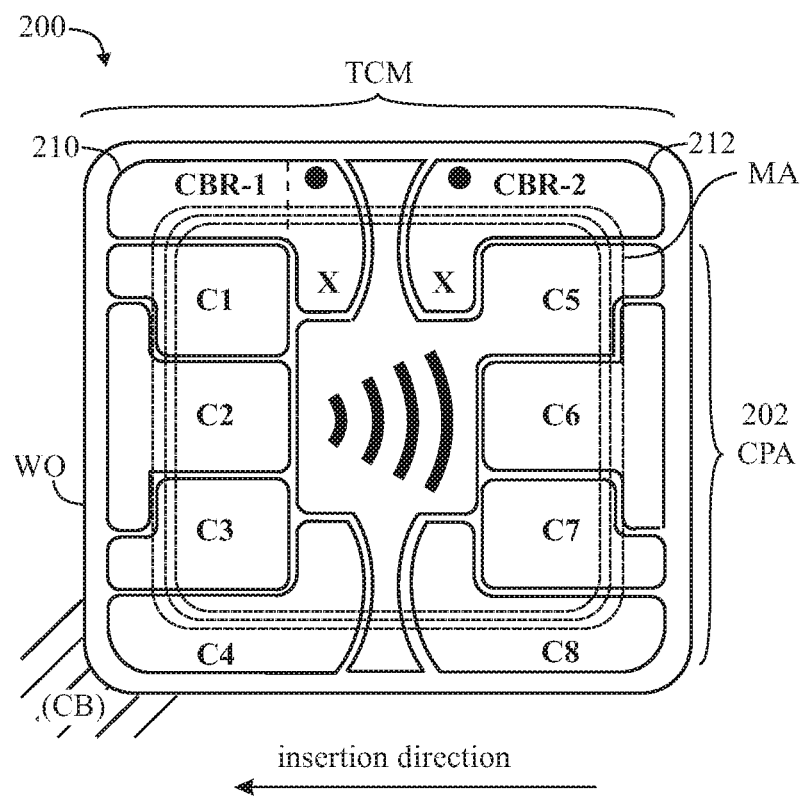
FIG. 11B is a diagram (plan view) of a contact side of a dual-interface antenna module (AM) or transponder chip module (TCM).

FIG. 11B shows an antenna module (AM) or transponder chip module (TCM) 200 having a contact pad array (CPA) 202 comprising of 8 contact pads (C1-C8). The transponder chip module (TCM) also has two connection bridges (CBR-1, CBR-2) 210, 212 on its contact (face-up) side of the module tape (MT, not shown). An RFID chip (CM, IC, not shown) and a module antenna (MA, shown in dashed lines) may be disposed on the face-down side (not visible) of the module tape (MT). A border is shown around the transponder chip module (TCM), which may represent an opening (WO) in a card body (CB, or inlay substrate) for the transponder chip module (TCM).

The connection bridges (CBR-1, CBR-2) and contact pads (C1-C8) may be formed from a common conductive layer or foil of copper (for example), such as on a single-sided module tape (MT) which may have a conductive layer (or foil) on its face-up side having a thickness of 35 μm. The module tape (MT) may also be double-sided, having conductive layers (foils) on both its face-up and face-down sides. Having two connection bridges (CBR-1, CBR-2) may be useful in circumstances (i) when there are two module antennas (MA-1, MA-2), or (ii) when there is a single module antenna (MA) with a center-tap, or (iii) when there is a single module antenna (MA) with both of its ends oriented outward Laser-Etched Antenna Structures (LES)

U.S. Pat. No. 9,272,370 (2016 Mat. 1; Finn et al.) discloses laser etching antenna structures for RFID antenna modules (AM) and combining laser etching and chemical etching. Limiting the thickness of the contact pads (CP) to less than the skin depth (18 μm) of the conductive material (copper) used for the contact pads (CP). Multiple antenna structures (AS1, AS2) in an antenna module (AM), and incorporating LEDs into the antenna module (AM) or smartcard (SC) are also disclosed.

Generally, the transponder chip modules (TCM) disclosed herein may have a conductive (typically copper) layer for forming a planar module antenna (MA, PA) which may have a thickness greater than or almost equal to the skin depth of copper (~18 μm), for example 18-35 μm, but it could also be 12 μm. The module antenna (MA) may be directly underneath the contact pads (CP) or connection bridges (CBR).

Generally, in practice, the thickness of metal cladding (metal layer ML, conductive layer CL) on one or both sides of a single-sided or double-sided module tape (MT), respectively, which may be laser-etched to form contact pads (CP) on the face-up side of the module tape (MT), a planar antenna (PA) on the face-down side of the module tape (MT), and a coupling frame (CP) on either side of the module tape (MT) is not less than 18 μm.

Planar antennas (PA) may be etched, particularly laser-etched, from a conductive layer (CL) on a module tape (MT), or other substrate, and may function as a module antenna (MA) or other antenna structure (AS) incorporated into a transponder chip module (TCM).

A planar antenna PA such as shown in FIG. 12A is an example of a conductive element of a transponder chip module which may be formed from a conductive (metal) layer (such as a conductive layer or cladding on a module tape, or a foil mounted to the module tape), and which has an interior area which may be processed (such as by etching)

to be free of residual metal. Residual metal remaining in the interior area of a conductive element (PA or CF) may be left in place and scribed (such as by laser etching) so that there are many small conductive pieces or segments rather than one large mass (area) of metal.

Removing much (or all) of the metal layer (ML) on the module tape (MT) which is remaining inside of the planar antenna (PA), may be time consuming, particularly when laser etching the conductive layer. Advantageously, the portion of the metal layer (ML) which is inside of (in an area internal to) the planar antenna (PA) may be segmented, such as by laser ablation, to have several isolated conductive structures, each structure (or segment) having an area which is only a fraction of the area inside the planar antenna.

In laser ablating single- or double-sided glass epoxy tape to expose an antenna structure (AS), there is inevitably a bulk area of copper which needs to be removed. This bulk removal of copper from the surface of the glass epoxy tape takes up valuable laser time. Inasmuch as the remaining copper is a conductive surface in the middle of the antenna, the remaining copper may significantly affect the resonance frequency and power delivery to the RFID chip (IC). In the case of a dual interface transponder chip module the same applies, there is an area in the middle of the laser etched module antenna (the position of the die) which needs to be removed. On the face-up (contact pad) side of the module tape (MT) there is also a large conductive (copper) area in the middle of the contact pad array (CPA), which is usually left in place and contiguous with the C5 contact pad.

It may be advantageous not to bulk remove the copper from the center (central area) of the module antenna (MA) (or, from the center of the contact pad array CPA), but rather to segment the remaining copper surface by creating slits or tracks in the copper by laser-etching, resulting in several smaller isolated conductive areas rather than one large conductive area. This may also be characterized as rendering the entire large area less conductive overall, and may be referred to as "profiling" the copper surface. Some examples will be presented.

FIG. 12A shows an etched planar antenna (PA, or antenna structure AS, or module antenna MA) 720 on a module tape (MT) 702 wherein the conductive layer 704 remaining at the interior area of the antenna (within the turns of the antenna) comprises a single large, residual conductive structure. This constitutes a "baseline" configuration, and having such a large area conductive structure within an interior area of the antenna may interfere with the operation of the antenna structure. Using chemical etching, the residual metal within the interior of the antenna is readily removed, along with forming the tracks (traces) of the antenna. However, using laser etching, it is generally not practical to remove such a large area of metal.

FIG. 12B shows planar antenna (PA, or antenna structure AS, or module antenna MA) 720 on a module tape (MT) 702 wherein the conductive layer 704 remaining at the interior area of the antenna structure (AS) has been segmented with "low" segmentation—in this example, one slit (SL) 706 extending in a first direction (horizontal, as viewed) across the remaining conductive layer, and nine slits (SL) 706 extending in another (such as perpendicular) direction (vertical, as viewed) across the remaining conductive layer, resulting in twenty (2×10, a plurality of) smaller isolated (from one another) conductive structures 704*b*. The slits (SL) may be evenly or unevenly spaced, and the resulting smaller isolated conductive structures (or "segments") may be the same size as one another, or different sizes than one another. The slits may be created by laser etching (or scribing). The resulting segments 704*b* are relatively small in comparison with one large conductive structure 704. There may be at least 10 (ten) segments.

FIG. 12C shows a planar antenna (PA, or antenna structure AS, or module antenna MA) 720 on a module tape (MT) 702 wherein the conductive layer 704 remaining at the interior area of the antenna structure (AS) has been segmented with "medium" segmentation—in this example, two slits (SL) 706 extending in a first direction (horizontal, as viewed) across the remaining conductive layer, and ten slits 706 extending in another (such as perpendicular) direction (vertical, as viewed) across the remaining conductive layer, resulting in thirty-three (3×11, a plurality of) smaller isolated (from one another) conductive structures 704*c*. The slits may be evenly or unevenly spaced, and the resulting smaller isolated conductive structures (or "segments") may be the same size as one another, or different sizes than one another. The slits may be created by laser etching (or scribing). The resulting segments 704*c* are relatively small in comparison with one large conductive structure 704. There may be at least 20 (twenty) segments.

FIG. 12D shows a planar antenna (PA, or antenna structure AS, or module antenna MA) 700 on a module tape (MT) 902 wherein the conductive layer 704 remaining at the interior area of the antenna structure (AS) has been segmented with "high" segmentation—in this example, three slits 706 extending in a first direction (horizontal, as viewed) across the remaining conductive layer, and nineteen slits 706 extending in another (such as perpendicular) direction (vertical, as viewed) across the remaining conductive layer, resulting in eighty (4×20, a plurality of) smaller isolated (from one another) conductive structures 704*d*. The slits may be evenly or unevenly spaced, and the resulting smaller isolated conductive structures (or "segments") may be the same size as one another, or different sizes than one another. The slits may be created by laser etching (or scribing). The resulting segments 704*d* are relatively small in comparison with one large conductive structure 704. There may be at least 50 (fifty) segments.

The resulting small isolated conductive structures may be on the order of 1 mm or less, and may be used to tune the performance or alter the resonance frequency of the antenna. Also, if the isolated conductive structures (segments) in the area inside the antenna are exposed, when a user touches them, this may change the resonance frequency of the antenna, such as to change it from approximately 18 MHz to approximately 14 MHz. Similarly, the isolated conductive structures (segments) may be used to sense conditions such as humidity.

EP 2541471 (Gemalto) discloses portable device with hollowed electrical contacts. An electronic portable device (20) comprises a support (21) receiving on one face (22) of the contact pads (23) extending substantially to the edge (24) of the face and connecting an electronic microcircuit (45). The device is distinguished in that ranges of conductive contacts comprise a plurality of perforations. FIG. 8 is illustrative. FIG. 1 of Gemalto shows "prior art", which is FIG. 2 of U.S. Pat. No. 8,100,337 (SPS).

U.S. Pat. No. 8,100,337 (SPS) discloses double interface communication electronic module, in particular for a chip card. An electronic module (11) with double communication interface, in particular for a chip card, the said module comprising firstly a substrate (27) provided with an electrical contact terminal block (17) allowing functioning by contact with the contacts of a reader, and secondly comprising an antenna comprising at least one turn (13) and whose terminals are connected to the terminals of a microelectronic chip situated on one face of the module (11). This module (11) is characterized in that the antenna turns (13) are situated substantially outside the area covered by the electrical contacts (17), so that the electrical contacts of the terminal block do not constitute electromagnetic shielding for the signals intended for the antenna. The invention applies in particular to the production of chip cards with double communication interface with contact and without contact. FIG. 2, therein, shows a plurality of protuberances 33 situated on the same side as the electrical contacts 17 but in the area which overhangs the antenna turns 13.

As is evident from the teachings set forth herein, any metal structures ("conductive elements") which are present in transponder chip modules could also be modified or segmented to alter their effect upon the resonance frequency of the module, so as to control the overall resonance frequency of the module, and all of its components, and to fine-tune the module's resonance frequency for various particular applications. Improvements in coupling with an external reader may thus be achieved.

The stack-up construction of a dual interface metal card may comprise several layers of coupling frames (RFID slit technology) which are electrically isolated from one another by adhesive or an adhesive-backed synthetic layer(s). As there is no electrical connection between these metal layers (typically 2 or 3 layers in the card stack-up), in addition to harvesting energy or for concentrating surface eddy currents to drive an antenna module (transponder chip module), an LED or a dynamic display (e-ink), the individual layers can be used as a cathode or anode. As the surface area of a metal card is large, the parallel plates (metal layers) may form part of a battery cell or a supercapacitor. Further, the layers of metal may form part of a sensor circuit in which the conductive plates/layers are used to take measurements from the physical touch (or proximity) of the metal card body by the bearer.

Coated metal cards with a nano-layer of diamond-like-carbon or titanium nitride (or any oxide layer) making the surface area non-conductive impairing the effects of electrostatic discharge (ESD) may have a defined area in which the bearer of the card can touch on each side (both, opposite sides) of the card body to effectuate a measurement or to switch-on a light source. Because of the layered construction, the perimeter edges of the metal card may also be used to short-circuit an electronic circuit by merely touching the exposed conductive metal edges.

A capacitor connected across the slit may be used to tune the resonance of the system frequency of the contactless metal card. Other component devices may also be connected across the slit such as an inductor (speaker), diode (LED), a resistor or a switch.

A dielectric layer of plastic on one surface of the metal card with a metallized coating or metallized antenna circuit may also be used to create an electrical component (RLC device). Other materials laminated to a metal layer or metal layers such as a flexible ceramic layer may be used for not only for aesthetics, but also to form part of a circuit device. A coupling frame layer may also be combined with a wire-embedded booster antenna with or without anti-shielding material (ferrite).

Avoiding Short Circuiting of Metal Inlay Layers during CNC Milling of the Module Pocket A stepped module opening (MO), or "pocket", in a metal embedded smartcard (plastic front/metal laminated core/plastic back) may be formed in the front plastic layer(s) and laminated metal core to accept the shape and dimensions of a transponder chip module (TCM).

Figure 16:
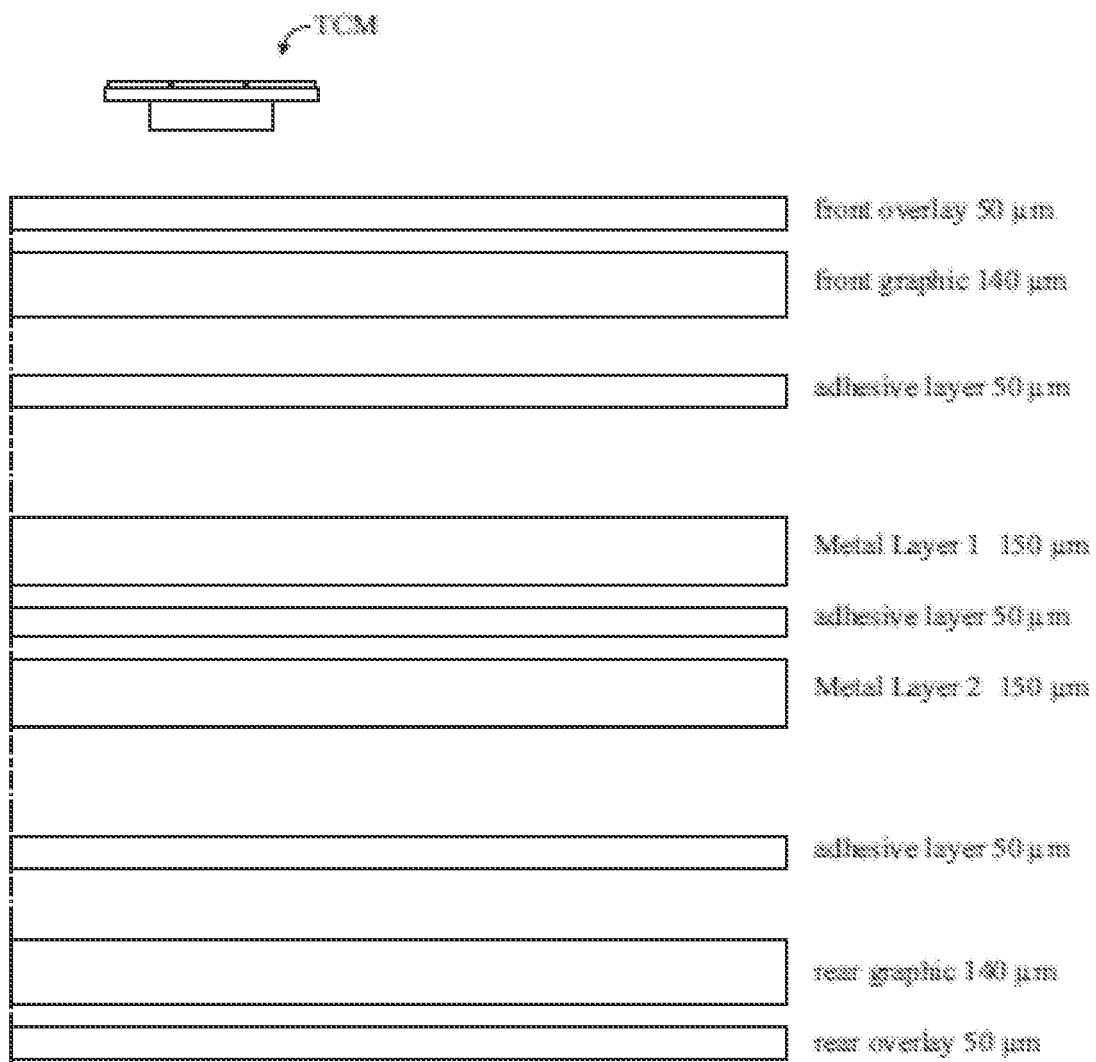
FIG. 16 is a diagram (in side cross-sectional view, exploded) of a smartcard, showing an exemplary lay-up of layers.

FIGS. 16, 17 illustrate a construction of a smart card. All dimensions approximate.

The laminated metal core (or inlay) may comprise two metal layers (ML1, ML2) separated by a dielectric or adhesive layer, and having a total thickness of 350 µm. The metal layers may be separated by a dielectric layer coated with adhesive. Plastic anti-scratch overlays and printed graphic layers may be provided front and back.

Overlay (plastic, anti-scratch) layer: 51 µm-2 mils
Front graphic (plastic) layer: 140 µm-5.5 mils
In aggregate, two front plastic layers ~200 µm
Adhesive layer 1: 51 µm post lamination (starts out, pre-lamination, 62.5 µm)—2 mils
Metal Inlay or Core: overall 350-358 µm—13.7 mils
ML1: 150 µm
Adhesive layer 2: 50 µm Adhesive
ML2: 150 µm
Adhesive layer 2: 51 µm post lamination (62.5 µm)—2 mils
Rear graphic layer: 140 µm—5.5 mils
Overlay layer: 51 µm—2 mils
In aggregate, two rear plastic layers~200 µm
Overall thickness of metal card body: 834 µm-32.8 mils The adhesive layers disclosed herein may be formed of a conventional overlay or similar material that is coated on one side with adhesive suitable for adhering to metal. The adhesive layer in this case may be laminated to the metal layers ML1 and ML2 in a first lamination step resulting in a laminated covered on both sides with plastic (e.g. Poly-vinyl-chloride, PET-G, Polycarbonate) or other material. The subsequent graphic layers may be laminated in a second step under conditions most suitable for these layers and to prevent or reduce effects of shrinkage and artwork distortion.

Prior to milling the core (ML1, adhesive, ML2), prepare a module cavity in ML1 (for P1), completely through ML1, laser cut (ablated), sized to be a little larger than the to-be-milled area in ML2 (for P2). This may be done in the un-folded state. ML2 is not formed at this stage, it may be milled after laminating the front and rear plastic layers. Slits (and fiducials) in metal layers ML1 and ML2 may be formed at this stage with the laser. The cavity in ML1 could be stamped, but is better to do with laser, and contemporaneously forming the slits (and fiducials) with the laser. After folding and laminating, mill through. This provides lateral offset between the two openings, avoiding "smearing" (burrs shorting the two metal layers). And reduces milling by 50% (ML1 is not milled), thereby extending tool life, cutting down on milling time, and allowing more precise milling of ML2 without penetrating the rear plastic layers.

A first milling step (P1), or portion of the stepped module opening, formed in the front plastic layer(s) and into the surface of the laminated metal core may be forming a pocket to accept the thickness and shape of the chip carrier tape or module tape (CCT, MT), having a recess depth of approximately 250 µm. Step 1=milling through the front plastic layers (200 µm), adhesive layer 1 (50 µm) and only partially (~1-10 µm) into M1 (150 µm).

A second milling step (P2), or portion of the stepped module opening, formed in the plastic layer(s) and laminated metal core may be dimensionally sized to match the assembly of the RFID die to the chip carrier tape (CCT, MT), by means of wire bonding or flip chip, and encapsulated with epoxy for environmental protection. The depth of the second step through the front plastic layer(s) and laminated metal core may be approximately 610 µm, a pocket extending from the first recess (P1) into the card body to a depth of 360 µm.

In a metal embedded smartcard comprising of a front plastic layer(s) and a rear plastic layer(s) sandwiching a laminated metal core comprising of two metal layers (ML1, ML2) with slits (S1, S2) offset from one another to act as a coupling frame, the recess depth of P2 comes close to the rear plastic layer(s) of the card body.

During milling (such as CNC milling) of the portions P1 and P2, there may be "smearing" of the module pocket walls caused by ageing or dulling of the milling tool which may result in an electrical short circuit between the first and second metal layer (ML1, ML2).

In an embodiment of the current invention, the electrical short circuit caused by CNC smearing at the interface of the metal layers may be avoided by laser cutting a module cavity (MC) in the first metal layer, thereby creating a clearance distance of approximately 0.5 mm between the steps P1 and the deep trench of P2.

Prior to milling of the module opening (MO) to accept a transponder chip module (TCM), a module cavity (MC) may be laser cut into the top metal layer of the inlay, or laminated metal core (consisting of a top metal layer, a dielectric layer and a bottom metal layer) before lamination. The dimensions of the module cavity (MC) may be sized to be slightly greater than the lateral dimensions of the P2 pocket.

The first step in milling may be to machine P1 which matches the contour dimensions of the front face plate of the module tape (MT) with contact pads (CP), and the second step in milling may be to machine P2 which is a pocket sized to accept the rear geometry of the transponder chip module (TCM). The intermediate step of laser cutting a module cavity (MC) in the top metal layer introduces a dimensional separation or clearance between the two metal layers before CNC milling A slit (S) may extend between an outer edge of a metal layer and the opening for the module. The inner (module opening) end of the slit may be damaged by the milling process. To avoid smearing (and short-circuiting) of the narrow slit(s) at the module openings (MO) resulting in a short circuit across the slit(s), a slit termination hole (STH) may be provided at the module opening end of the slit. See FIG. 17 ML2, wherein S1 shows an exemplary STH.

Figure 13:
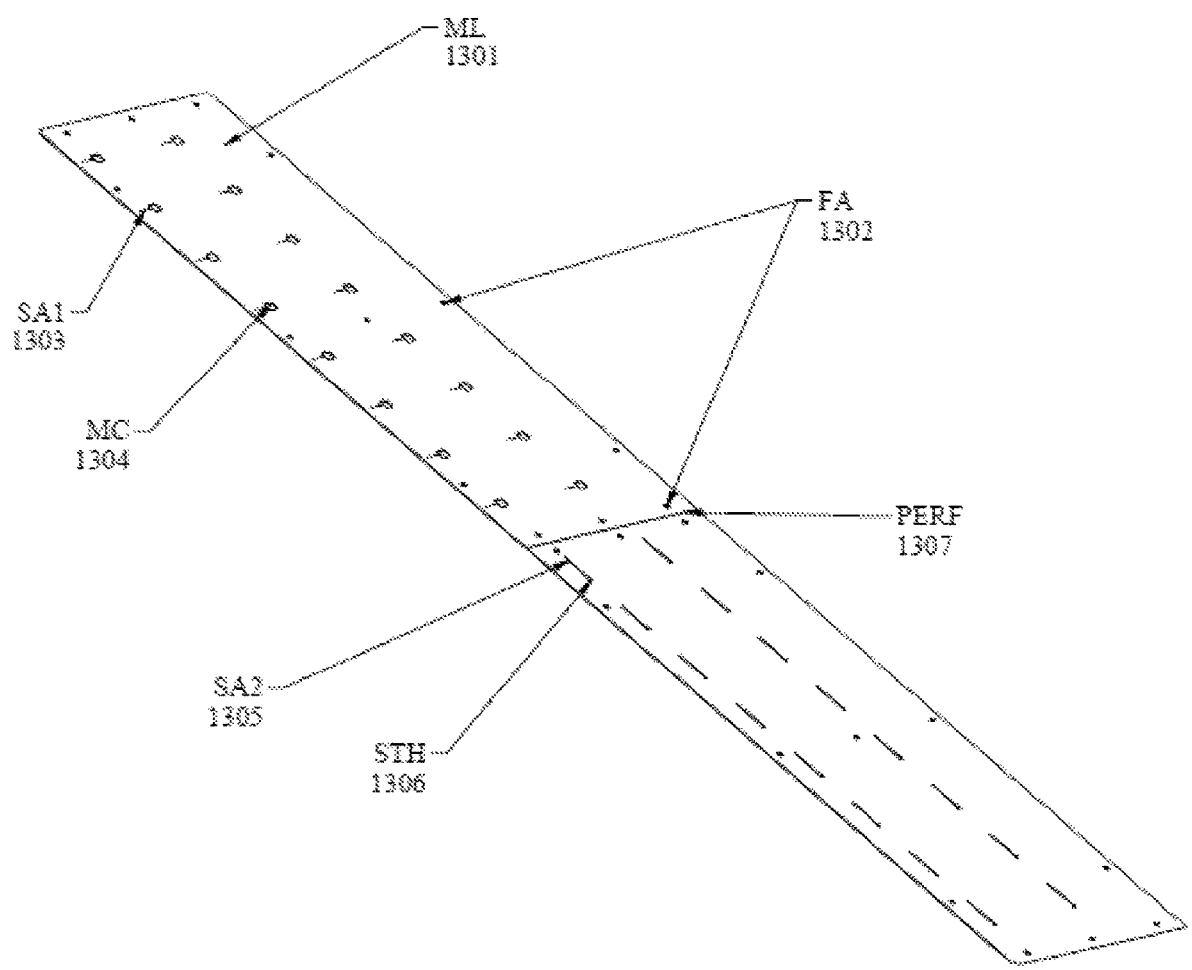
FIG. 13 is a diagram of a single metal layer (ML) which can be folded along a line of perforations (PERF) to create a two layer metal inlay.
Figure 14:
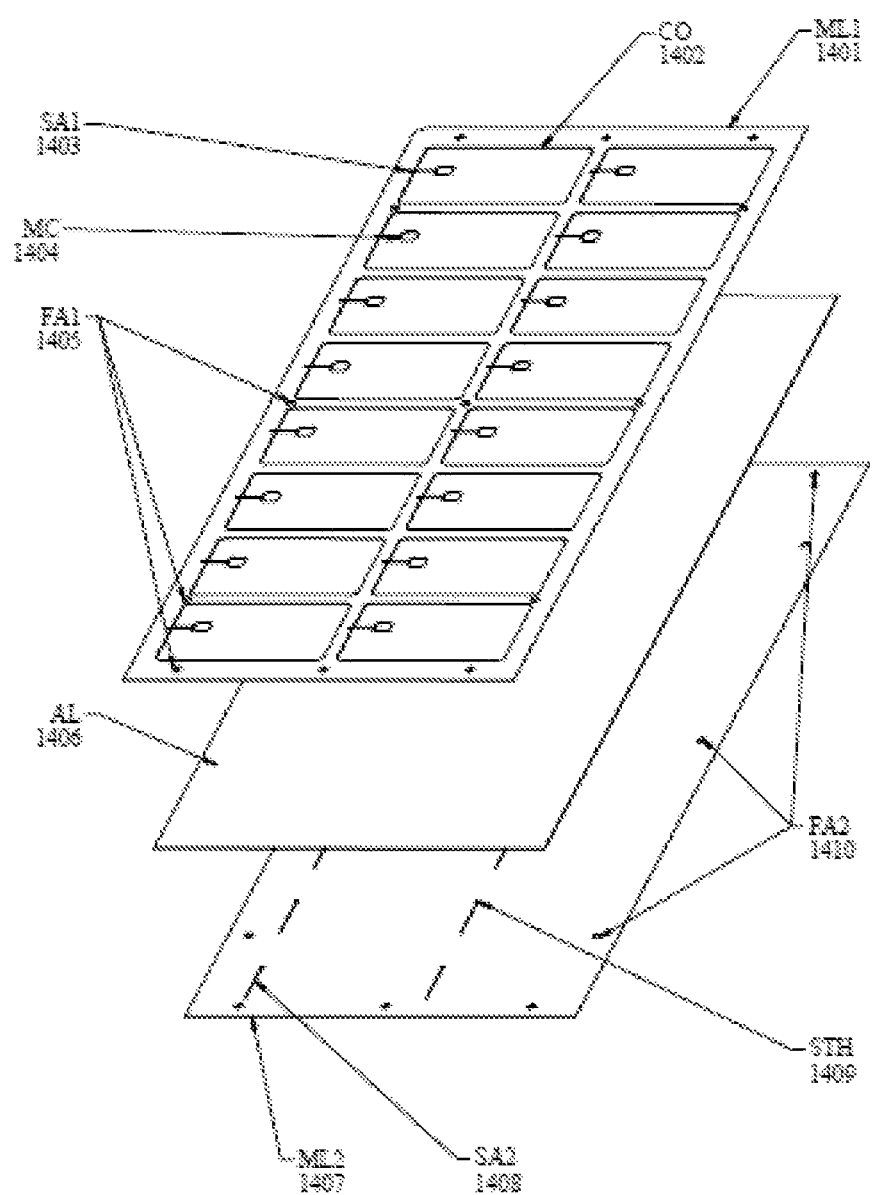
FIG. 14 is a diagram (in perspective view, exploded) of a two layer metal inlay separated by an adhesive layer (AL) in a 2×8 format.
Figure 15:
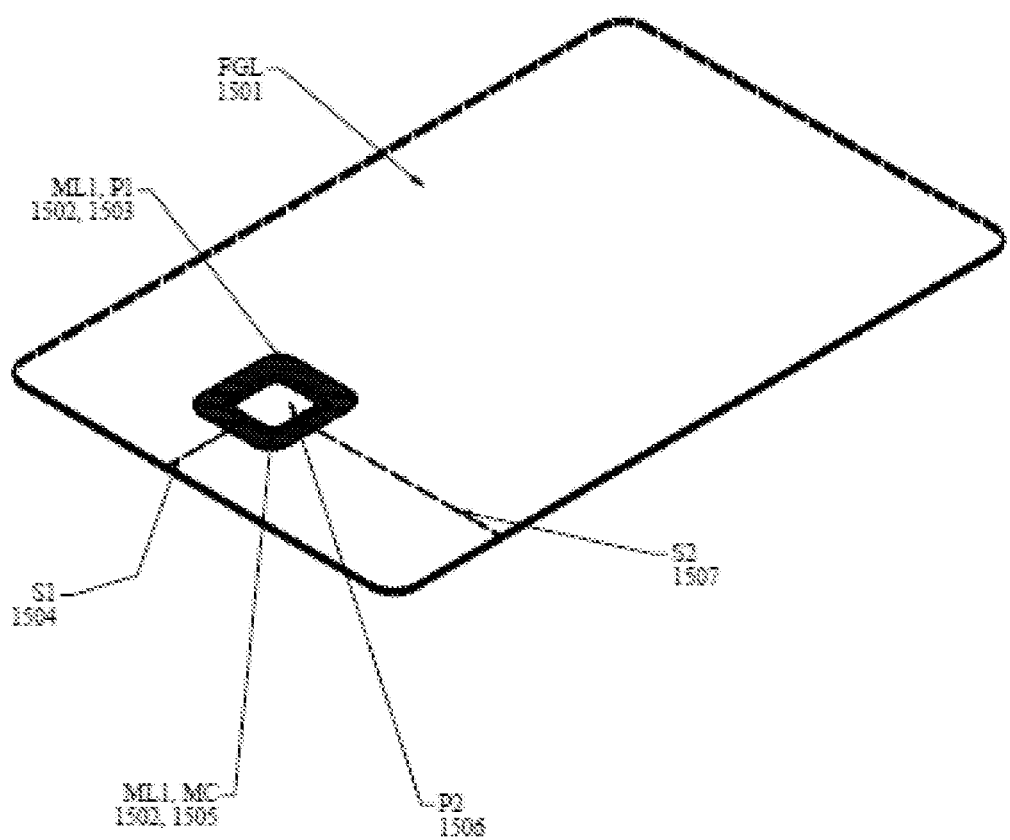
FIG. 15 is a diagram (in perspective view) of a metal card body having slits (S1, S2) to act as a coupling frame (CF) illustrating a stepped recess (P1, module cavity (MC) and P2) to accept a transponder chip module.

FIGS. 13-17 illustrate an exemplary technique for forming a smartcard having a metal core comprising two metal layers, at least one of which is a coupling frame having a slit extending from a peripheral edge of the metal core to a module opening for receiving a transponder chip module. Generally, a single metal layer (or sheet) is provided with slits and module openings for a plurality of metal cores for a plurality of smartcards. The single metal layer may be folded to form two overlapping (stacked) metal layers, separated by an adhesive layer. In FIGS. 13 & 14, a plurality of sites, or card outline positions may be shown, for forming a plurality of metal cores for a plurality of smartcards. FIGS. 15-17 show, in greater detail, some details of the resulting smartcard construction.

FIG. 13 illustrates a single metal layer (ML, 1301) which can be folded in the center at the perforations (PERF 1307) to create a two layer metal inlay. On the left hand side (top left, as viewed) of the perforations (PERF 1307) in the center of the metal layer (ML 1301), registration marks for alignment are provided in the form of an array of fiducials (FA 1302); an array of front face slits (SA1 1303) are provided with their ends finishing in slit termination holes (STH 1306) and module cavities (MC 1304) at each inlay site are also provided in this top metal layer 1301. On the right hand side of the perforations (PERF 1307), an array of slits (SA2 1305) end in slit termination holes (STH 1306) forming the bottom (or rear) metal layer of the metal inlay. Some more detail may be provided in FIG. 14.

Legend for FIG. 13:
1301 ML: Metal Layer
1302 FA: Fiducial Array
1303 SA1: Slit Array 1
1304 MC: Module Cavity
1305 SA2: Slit Array 2
1306 STH: Slit Termination Hole
1307 PERF: Perforation FIG. 14 is a diagram (in perspective view, exploded) of a two layer metal inlay separated by an adhesive layer (AL) in a 2×8 format. For illustrative convenience, folding of the metal layer (compare FIG. 13) at the perforations is not shown, but rather the layers are separated from each other to provide better understanding of the stack-up construction before lamination, forming the core of a metal embedded smartcard.

A top (or front, or upper) metal layer (ML1, 1401) may comprise a plurality (an array) of slits (SA1, 1403) and module cavities (MC 1404). A given slit and module cavity may be disposed at a given one of a plurality of card outline (CO 1402) positions. Fiducials (FA1, 1405) may be provided in the top layer for registration with the bottom layer when folding to form a metal core for a smartcard.

A bottom (or rear, or lower) metal layer (ML2, 1407) may comprise a plurality of slits (SA2, 1408) which may extend to (finish, terminate at) a plurality of slit termination holes (STH, 1409), rather than module cavities. Fiducials (FA2, 1410) may be provided in the bottom layer for registration with the top layer when folding to form a metal core for a smartcard.

A double-sided Adhesive Layer (AL 1406) may be provided between the top and bottom layers for bonding the metal layers together to form the metal core for the smartcard.

In a manufacturing process, the top and bottom metal layers with the adhesive in center may be laminated together to form a metal core.

Legend for FIG. 14:
1401 ML1: Metal Layer 1
1402 CO: Card Outline
1403 SA1: Slit Array 1
1404 MC: Module Cavity
1405 FA1: Fiducial Array 1
1406 AL: Adhesive Layer
1407 ML2: Metal Layer 2
1408 SA2: Slit Array 2
1409 STH: Slit Termination Hole
1410 FA2: Fiducial Array 2

FIG. 15 is a plan view of a metal card body having slits (S1, S2) to act as a coupling frame (CF) illustrating a stepped recess (P1, module cavity (MC) and P2) to accept a transponder chip module. The diagram illustrates a single metal card body having a Front Graphic Layer (FGL, 1501) and a metal core produced by laminating the top metal layer (ML1, 1502) with slit (S1, 1504) to a bottom metal layer (not shown) with slit (S2, 1507). The top metal layer (ML1, 1502) has a laser cut module cavity (MC, 1505), prior to CNC milling of the card body from the metal inlay. This module cavity (MC) provides a separation distance between the P1 pocket in the top metal layer and the P2 trench in the bottom metal layer, eliminating the possibility of a short circuit between the metal layers during CNC milling. The module cavity may be referred to as a module opening, or as a pocket.

Legend for FIG. 15:
1501 FGL: Front Graphic Layer
1502 ML1: Metal Layer 1
1503 P1: First Milled Cavity
1504 S1: First Slit
1505 MC: Module Cavity (giving the stepped feature)
1506 P2: Second Milled Cavity
1507 S2: Second Slit After folding over the single foil (metal layer) to make two overlapping metal layers (each with a slit and an opening), a plurality of single metal cores (or inlays) for smartcards may be singulated (1402, CO). With a dielectric (electrically insulating) adhesive disposed between the two (folded-over) metal layers, the two metal layers may be electrically insulated from one another—in effect, resulting in two individual overlapping coupling frames.

Alternatively, when singulation is performed, one common edge of the two metal layers may be left uncut, so that there is essentially one large (twice the area of the card) coupling frame which is folded over itself, the "oversize" coupling frame having one portion with and opening and a slit, and another portion with an opening and a slit. The openings should line up to receive the transponder chip module. The slits should not be lined up with one another, rather they should be positioned and/or oriented differently than one another.

In another variation (alternative), the folded over metal layer may be singulated (cut out), as previously described, resulting in two distinct (individual) overlapping coupling frames, and a small area or strip of conductive adhesive may be disposed between the two resulting coupling frames, such as between a common edge thereof, to electrically connect the two coupling frames with one another. The remaining larger area between the two coupling frames should have non-conductive adhesive, as previously described, to join the two coupling frames together while preventing their slits from being shorted out.

It should be understood that some of the techniques disclosed herein, and benefits derived therefrom, may be obtained by stacking (and aligning) two distinct metal layers (having slits and module openings), rather than by folding one layer over on itself.

FIG. 16 shows a stack-up of a resulting smartcard, comprising:
- a front overlay layer and a front graphic layer mounted with an adhesive layer to the top metal layer (Metal Layer 1)
- the metal core, comprising the top metal layer (Metal Layer 1) and bottom metal layer (Metal Layer 2) joined by an adhesive layer
- a rear overlay layer and a rear graphic layer mounted with an adhesive layer to the bottom metal layer (Metal Layer 2)

Exemplary dimensions (thicknesses) for the layers are shown in the drawing, and are approximate FIG. 17(A) shows the top metal layer (ML1) with its slit (S1) and module opening (MO1), and a transponder chip module (TCM) which will be disposed in the module opening. The module opening and slit may be laser cut, prior to laminating the top and bottom layers together. The slit (S1) may extend from an outer peripheral edge (such as the left edge, as viewed) of the top metal layer to the module opening (or vice-versa).

FIG. 17(B) shows the bottom metal layer (ML2) with its slit (S2) and module opening (MO2). The module opening may be milled, after laminating the top and bottom layers together. The slit may be laser cut, prior to laminating the top and bottom layers together. The slit (S2) may extend from an outer peripheral edge (such as the bottom edge, as viewed) of the top metal layer to the module opening (or vice-versa).

The slits (S1, S2) are disposed at different positions than one another, and may be oriented differently than one another so the slit of a given metal layer is supported by a non-slit area of the other metal layer. The adhesive layer between the two metal layers prevents one metal layer from shorting out the slit of the other metal layer.

The slits may extend from any position of their respective openings to any position on the periphery of the metal layer. The slits may extend at any angle from the respective module opening to the peripheral edge of the respective metal layer. The slits may be other than straight, such as curved, meandering, etc.

Resonance and Frequency Shifting

The transponder chip module (TCM) may be modified to lower its resonance frequency, which may then be upwardly shifted by the presence of a coupling frame (CF), contact pads (CP) and the like (any conductive metal elements in or near the module). Various features of the module antenna (MA) may be modified. Various features of the coupling frame (CF), such as its dimensions may be modified.

Smartcard having a transponder chip module and a coupling frame, wherein:
  a frequency of the module itself is set to a frequency lower than 13.56 MHz; and
  the frequency of the module is up-shifted by the coupling frame to be higher than 13.56 MHz.

The frequency of the module itself may be 13 MHz +/−0.3; and the up-shifted frequency may be approximately 14 MHz.

A method of improving performance of a smartcard having a transponder chip module having an RFID chip and a module antenna, and a card body having at least one coupling frame, comprising:
  setting a resonant frequency of the module itself to be lower than 13.56 MHz.

The resonant frequency may be set by one or more of these features of antenna geometry:
  pitch;
  track width;
  number of windings;
  resulting length of the antenna;
  overall outer dimension (OD) of the antenna; and
  inner dimension (ID) of the antenna.

The resonant frequency of the module may be upshifted in the presence of the coupling frame to be higher than 13.56 MHz.

One or more of the following features of the coupling frame may be modified:
  the overall size of the coupling frame (CF), which is nominally the same as the overall size of the card body (e.g., ID-1);
  the size of the opening (MO) in the coupling frame;
  the extent to which the coupling frame overlaps the module antenna—i.e., how many turns are overlapped; and
  the resonance frequency of the coupling frame.

The thickness of an insulating layer between the coupling frame and the module antenna may be modified.

Conductive elements, such as contact pads, may be segmented.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:

1. A smartcard comprising:
a metal portion folded over itself to create a two layer metal inlay having a top metal layer and a bottom metal layer, wherein the top metal layer comprises a module cavity and a first slit extending from an outer edge of the top metal layer to the module cavity, and wherein the bottom metal layer comprises a module opening and a second slit extending from an outer edge of the bottom metal layer to the module opening; and
a layer of adhesive between the top metal layer and bottom metal layer.

2. The smartcard of claim 1, wherein the module cavity in the top metal layer and the module opening in the bottom metal layer form a stepped recess for receiving a transponder chip module.

3. The smartcard of claim 1, further comprising:
a front overlay layer and a front graphic layer mounted with an adhesive layer to the top metal layer; and
a rear overlay layer and a rear graphic layer mounted with an adhesive layer to the bottom metal layer.

4. The smartcard of claim 1, further comprising:
a top plastic layer disposed atop the top metal layer;
an adhesive layer disposed between the top and bottom metal layers;
wherein the top plastic layer has a thickness of approximately 150 μm;
wherein the top metal layer has a thickness of approximately 150 μm;
wherein the adhesive layer has a thickness of approximately 50 μm;
wherein the bottom metal layer has a thickness of approximately 150 μm;
wherein the laminated metal core has a thickness of approximately 350 μm;
wherein the module cavity has a depth of approximately 250 μm; and
wherein the module opening has a depth of approximately 360 μm.

5. A method of manufacturing a metal core for at least one smartcard, comprising:
providing a first metal layer;
providing a second metal layer;
providing an adhesive layer between the first and second metal layers; and
laminating the first and second metal layers together to form the metal core;
characterized by:
forming a first portion of a stepped opening in the first metal layer, wherein the first portion has a first thickness and shape; and
forming a second portion of the stepped opening in the second metal layer, wherein the second portion has a second thickness and shape.

6. The method of claim 5, wherein:
the thickness and shape of the first portion of the stepped opening corresponds with a thickness and shape of a chip carrier tape of a transponder chip module; and
the thickness and shape of the second portion of the stepped opening corresponds with a thickness and shape of an assembly and encapsulation of an RFID die to the chip carrier tape.

7. The method of claim 5, further comprising:
wherein the first portion of the stepped opening is formed by laser cutting a module cavity in the first metal layer; and
wherein the second portion of the stepped opening is formed by milling a module opening in the second metal layer.

8. The method of claim 5, further comprising:
laminating front plastic overlay and graphic layers and rear plastic overlay and graphic layers to the front and rear of the metal core, respectively;
performing the milling of the module opening in the second metal layer after laminating the overlay and graphic layers to the core.

9. The method of claim 5, further comprising prior to laminating, forming fiducials in the first and second metal layers.

10. The method of claim 5, further comprising:
prior to laminating, forming a first slit in the first metal layer extending from an outer edge of the first metal layer to the module cavity;
prior to laminating, forming a second slit in the second metal layer extending from an outer edge of the second metal layer to a position of a not-yet-formed module opening in the second metal layer; and
after laminating, performing milling to form the module opening in the second metal layer.

11. The method of claim 10, further comprising, at least one of:
providing a first slit termination hole at at least one of an outer end of the first slit at the outer edge of the first metal layer and an inner end of the first slit at the module cavity; and
providing a second slit termination hole at at least one of an outer end of the second slit at the outer edge of the second metal layer and an inner end of the second slit at the module opening.

12. The method of claim 5, wherein the two metal layers are formed on a single sheet, and are "stacked" by folding one metal layer atop the other.

13. A smartcard comprising a metal layer having an outer edge, an opening for receiving at least a portion of a transponder chip module, and a slit extending through the metal layer from one end at the outer edge of the metal layer to another end at the opening wherein the slit is wider at the outer edge end or at the opening.

14. The smartcard of claim 13, further comprising a termination hole at the outer edge end of the slit or at the opening end of the slit.

15. The smartcard of claim 14, wherein the slit has termination holes at both of its outer edge end and opening end.

16. The smartcard of claim 14, wherein the termination hole has a geometry selected from the group consisting of a circular hole, a triangle, a rectangle, a trapezoid, or a tapered rectangle.

17. The smartcard of claim 13, wherein the slit varies in geometry along its length.

* * * * *